United States Patent
Ohishi et al.

(10) Patent No.: US 9,056,997 B2
(45) Date of Patent: Jun. 16, 2015

(54) INK-JET RECORDING APPARATUS, INK-JET RECORDING METHOD, RECORDED MATTER AND COMPOSITE BLACK

(71) Applicant: Brother Kogyo Kabushiki Kaisha, Nagoya-shi, Aichi-ken (JP)

(72) Inventors: Ayako Ohishi, Nagoya (JP); Junichiro Sugimoto, Nagoya (JP); Noriaki Satoh, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/527,866

(22) Filed: Oct. 30, 2014

(65) Prior Publication Data

US 2015/0116392 A1    Apr. 30, 2015

(30) Foreign Application Priority Data

Oct. 30, 2013 (JP) .................................. 2013-225098

(51) Int. Cl.

| | | |
|---|---|---|
| G01D 11/00 | (2006.01) | |
| C09D 11/328 | (2014.01) | |
| C08K 5/23 | (2006.01) | |
| C08K 5/3437 | (2006.01) | |
| C08K 5/3432 | (2006.01) | |
| C08K 5/3492 | (2006.01) | |

(Continued)

(52) U.S. Cl.
CPC .............. *C09D 11/328* (2013.01); *C08K 5/235* (2013.01); *C08K 5/3437* (2013.01); *C08K 5/3432* (2013.01); *C08K 5/3492* (2013.01); *C08K 5/3417* (2013.01); *C08K 5/053* (2013.01); *B41J 2/21* (2013.01)

(58) Field of Classification Search
CPC ...... C09D 11/40; C09D 11/322; C09D 11/54; C09D 11/324; B41J 2/2107; B41J 2/211
USPC ............. 347/5, 7, 43, 95, 96, 100; 106/31.47, 106/31.48, 31.49
See application file for complete search history.

(56) References Cited

U.S. PATENT DOCUMENTS 7,211,132 B2 *  5/2007 Oki et al. .................... 106/31.47
7,600,864 B2 * 10/2009 Kataoka ........................ 347/100

(Continued)

FOREIGN PATENT DOCUMENTS

| JP | H0768796 A | 3/1995 |
|---|---|---|
| JP | 2004-276397 A | 10/2004 |

(Continued)

*Primary Examiner* — An Do
(74) *Attorney, Agent, or Firm* — Banner & Witcoff, Ltd.

(57) ABSTRACT

An ink-jet recording apparatus performing recording on a recording medium includes: a water-based yellow ink containing a yellow dye, a water-based magenta ink containing a magenta dye and a water-based cyan ink containing a cyan dye of which hue angles $\angle H°$ defined in a CIELAB color space are within the predetermined ranges; an ink-jet head configured to discharge the water-based yellow, magenta and cyan inks; and a controller configured to control the ink-jet head so as to satisfy the following conditions (A) and (B) to thereby form a composite black on the recording medium: (A) $0.66 \leq C/(Y+M)$ and (B) $530 \leq Y+M+C \leq 600$, wherein in the conditions (A) and (B): Y, M and C are drop amounts (ng) of the yellow dye, the magenta dye and the cyan dye dropped in a 25.4 mm×25.4 mm area of the recording medium, respectively.

20 Claims, 2 Drawing Sheets

(51) Int. Cl.
    *C08K 5/3417*     (2006.01)
    *C08K 5/053*     (2006.01)
    *B41J 2/21*     (2006.01)

(56) References Cited

U.S. PATENT DOCUMENTS

| | | |
|---|---|---|
| 8,016,404 B2 | 9/2011 | Kato et al. |
| 8,460,449 B2 | 6/2013 | Goto et al. |
| 8,603,232 B2 | 12/2013 | Tsuzaka et al. |
| 8,851,651 B2 | 10/2014 | Hirata et al. |
| 2008/0241398 A1 | 10/2008 | Kato et al. |
| 2011/0128333 A1 | 6/2011 | Goto et al. |
| 2012/0249667 A1 | 10/2012 | Hirata et al. |

FOREIGN PATENT DOCUMENTS

| | | |
|---|---|---|
| JP | 2008-246821 A | 10/2008 |
| JP | 2010-037504 A | 2/2010 |
| JP | 2011-111611 A | 6/2011 |
| JP | 2012-006270 A | 1/2012 |
| JP | 2012-206479 A | 10/2012 |

* cited by examiner

INK-JET RECORDING APPARATUS, INK-JET RECORDING METHOD, RECORDED MATTER AND COMPOSITE BLACK

CROSS REFERENCE TO RELATED APPLICATION

The present application claims priority from Japanese Patent Application No. 2013-225098, filed on Oct. 30, 2013, the disclosure of which is incorporated herein by reference in its entirety.

BACKGROUND OF THE INVENTION

1. Field of the Invention

The present invention relates to an ink-jet recording apparatus, an ink-jet recording method, a recorded matter and a composite black.

2. Description of the Related Art

There is proposed a variety of kinds of water-based ink set for ink-jet recording (hereinafter referred to as "water-based ink set" or "ink set" in some cases) having excellent fixing property (fixability) on a recording medium and suitable for forming a composite black by mixing a water-based yellow ink, a water-based magenta ink and a water-based cyan ink (see, for example, Japanese Patent Application Laid-open No. 2010-037504).

The conventional water-based ink sets are desired to realize a composite black with an improved optical density (OD value).

An object of the present teaching is to provide an ink-jet recording apparatus, ink-jet recording method and recorded matter capable of increasing the optical density (OD value) of the composite black and realizing excellent fixability. Another object of the present teaching is to provide a composite black capable of increasing the optical density (OD value) of the composite black and realizing excellent fixability.

SUMMARY OF THE INVENTION

According to a first aspect of the present teaching, there is provided an ink-jet recording apparatus configured to perform recording on a recording medium, the apparatus including:

a water-based yellow ink which contains a yellow dye and of which hue angle $\angle H°$ defined in a CIELAB color space on the recording medium is in a range of 80° to 100°;

a water-based magenta ink which contains a magenta dye and of which hue angle $\angle H°$ defined in the CIELAB color space is in a range of 0° to 5° or in a range of 345° to 360°;

a water-based cyan ink which contains a cyan dye and of which hue angle $\angle H°$ defined in the CIELAB color space is in a range of 220° to 240°;

an ink-jet head configured to discharge the water-based yellow ink, the water-based magenta ink and the water-based cyan ink; and a controller configured to control the ink-jet head;

wherein the controller controls the ink-jet head so as to satisfy the following conditions (A) and (B) to thereby form a composite black on the recording medium:

$$0.66 \leq C/(Y+M) \tag{A}$$

$$530 \leq Y+M+C \leq 600, \tag{B}$$

wherein in the conditions (A) and (B):

Y: a drop amount (ng) of the yellow dye dropped in a 25.4 mm×25.4 mm area of the recording medium;

M: a drop amount (ng) of the magenta dye dropped in the 25.4 mm×25.4 mm area of the recording medium; and C: a drop amount (ng) of the cyan dye dropped in the 25.4 mm×25.4 mm area of the recording medium.

According to a second aspect of the present teaching, there is provided an ink-jet recording method for performing recording on a recording medium, the method including discharging, onto the recording medium, the water-based yellow ink, the water-based magenta ink and the water-based cyan ink so as to satisfy the above conditions (A) and (B) to thereby form a composite black on the recording medium, wherein the water-based yellow ink contains a yellow dye and has hue angle $\angle H°$ defined in a CIELAB color space on the recording medium in a range of 80° to 100°, the water-based magenta ink contains a magenta dye and has hue angle $\angle H°$ defined in the CIELAB color space in a range of 0° to 5° or in a range of 345° to 360°, and the water-based cyan ink contains a cyan dye and has hue angle $\angle H°$ defined in the CIELAB color space in a range of 220° to 240°.

According to a third aspect of the present teaching, there is provided a recorded matter recorded by the ink-jet recording method according to the second aspect of the present teaching.

According to a fourth aspect of the present teaching, there is provided a composite black formed on a recording medium with an ink-jet recording method by using a water-based yellow ink which contains a yellow dye and of which hue angle $\angle H°$ defined in a CIELAB color space on the recording medium is in a range of 80° to 100°, a water-based magenta ink which contains a magenta dye and of which hue angle $\angle H°$ defined in the CIELAB color space is in a range of 0° to 5° or in a range of 345° to 360°, and a water-based cyan ink which contains a cyan dye and of which hue angle $\angle H°$ defined in the CIELAB color space is in a range of 220° to 240° so as to satisfy the above conditions (A) and (B).

DESCRIPTION OF THE PREFERRED EMBODIMENTS

Figure 1A:
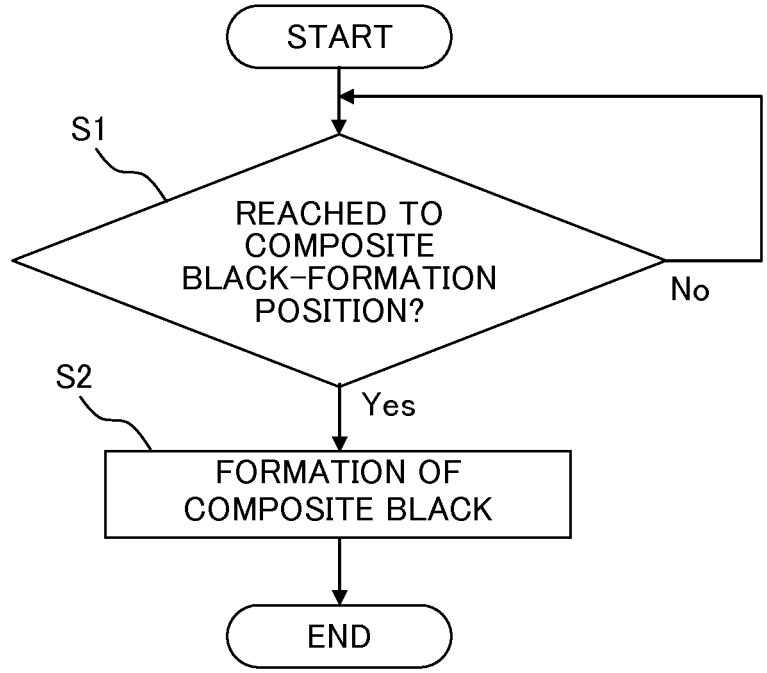
FIG. 1A is a flow chart showing an example of formation of composite black in the present teaching.

In the present teaching, the recording medium includes a "glossy paper sheet (glossy paper), and the term "glossy paper sheet (glossy paper)" means a recording paper (recording paper sheet) having at least one coating layer on a recording surface thereof. Examples of the glossy paper sheet include photo glossy paper sheets "BP61G" and "BP71G" manufactured by BROTHER KOGYO KABUSHIKI KAISHA; ink-jet paper sheet "Kassai" Photo-finish Pro, manufactured by FUJI FILM CORPORATION; highest grade glossy paper "PWRA4-20" manufactured by KODAK JAPAN LTD.; and the like.

In the ink-jet recording apparatus and the ink-jet recording method of the present teaching, the recording is performed by using the water-based yellow ink, water-based magenta ink and water-based cyan ink, as described above.

[Water-Based Yellow Ink]

As described above, the water-based yellow ink contains the yellow dye and the hue angle $\angle H°$ of the water-based yellow ink which is defined in the CIELAB color space on a recording medium is in a range of 80° to 100°. There is no particular limitation to the composition of the water-based yellow ink, provided that the water-based yellow ink contains the yellow dye and the hue angle $\angle H°$ of the water-based yellow ink which is defined in the CIELAB color space is in a range of 80° to 100°.

The yellow dye preferably includes a yellow dye (Y-1) and a yellow dye (Y-2) as described below:

yellow dye (Y-1): a dye represented by the following formula (Y-1); and yellow dye (Y-2): at least one dye selected from the group consisting of C. I. Direct Yellow 86, C. I. Direct Yellow 132, and C. I. Direct Yellow 142.

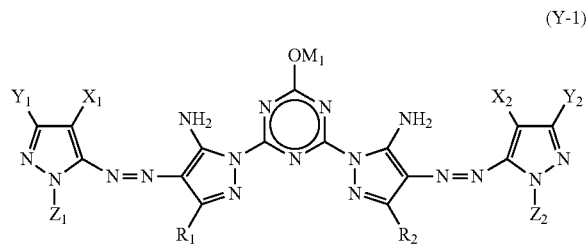

(Y-1)

In the formula (Y-1), $R_1$, $R_2$, $Y_1$, and $Y_2$ each represent a monovalent group, and may be identical to or different from each other. The monovalent group is a hydrogen atom, or a monovalent substituent. The monovalent substituent includes a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxy carbonyloxy group, an aryloxycarbonyloxy group, an amino group such as an alkylamino group or an arylamino group, an amide group, an acylamino group, an ureido group, an amino carbonyl amino group, an alkoxy carbonyl amino group, an aryloxycarbonyl amino group, a sulfamoyl amino group, an alkyl sulfonyl amino group, an aryl sulfonyl amino group, an alkylthio group, an arylthio group, a heterocyclic thio group, a sulfamoyl group, an alkyl sulfinyl group, an aryl sulfinyl group, an alkyl sulfonyl group, an aryl sulfonyl group, an acyl group, an aryloxycarbonyl group, an alkoxy carbonyl group, a carbamoyl group, a phosphino group, a phosphinyl group, a phosphinyloxy group, a phosphinyl amino group, a silyl group, an azo group, an imide group, and the like. Each of the above-described monovalent substituents may further have a substituent. Out of these, the monovalent substituent is preferably a hydrogen atom, a halogen atom, an alkyl group, an aryl group, a heterocyclic group, a cyano group, an alkoxy group, an amide group, an ureido group, an alkyl sulfonyl amino group, an aryl sulfonyl amino group, a sulfamoyl group, an alkyl sulfonyl group, an aryl sulfonyl group, a carbamoyl group, or an alkoxy carbonyl group. Further, the monovalent substituent is more preferably a hydrogen atom, an alkyl group, an aryl group, a cyano group, or an alkyl sulfonyl group.

In the formula (Y-1), the halogen atom is a chlorine atom, a bromine atom, or an iodine atom. Out of these, the halogen atom is preferably a chlorine atom or a bromine atom.

In the formula (Y-1), the alkyl group includes a substituted or unsubstituted alkyl group. The substituted or unsubstituted alkyl group is preferably an alkyl group having 1 to 30 carbon atoms. The alkyl group includes a methyl group, an ethyl group, a butyl group, a tert-butyl group, an n-octyl group, an eicoxy group, a 2-chloroethyl group, a hydroxyethyl group, a cyano ethyl group, a 4-sulfobutyl group, and the like. The substituent of the substituted alkyl group includes a straight or branched chain alkyl group having 1 to 12 carbon atoms such as a methyl group, an ethyl group, a propyl group, an isopropyl group, a sec-butyl group, a tert-butyl group, a 2-ethylhexyl group, a 2-methyl sulfonyl ethyl group, a 3-phenoxypropyl group, a trifluoromethyl group, or the like; a straight or branched chain aralkyl group having 7 to 18 carbon atoms; a straight or branched chain alkenyl group having 2 to 12 carbon atoms; a straight or branched chain alkynyl group having 2 to 12 carbon atoms; a straight or branched chain cycloalkyl group having 3 to 12 carbon atoms such as a cyclopentyl group or the like; a straight or branched chain cycloalkenyl group having 3 to 12 carbon atoms; a halogen atom such as a chlorine atom, a bromine atom, or the like; an aryl group such as a phenyl group, a 4-tert-butylphenyl group, a 2,4-di-tert-amyl phenyl group, or the like; a heterocyclic group such as an imidazolyl group, a pyrazolyl group, a triazolyl group, a 2-furyl group, a 2-thienyl group, a 2-pyrimidinyl group, a 2-benzothiazolyl group, or the like; a cyano group; a hydroxyl group; a nitro group; a carboxyl group; an amino group; an alkoxy group such as a methoxy group, an ethoxy group, a 2-methoxyethoxy group, a 2-methyl sulfonyl ethoxy group, or the like; an aryloxy group such as a phenoxy group, a 2-methyl phenoxy group, a 4-tert-butyl phenoxy group, a 3-nitro phenoxy group, a 3-tert-butyloxy carbonyl phenoxy group, a 3-methoxy carbonylphenyloxy group, or the like; an acylamino group such as an acetamide group, a benzamide group, a 4-(3-tert-butyl-4-hydroxy phenoxy)butaneamide group, or the like; an alkylamino group such as a methylamino group, a butylamino group, a diethylamino group, a methyl butylamino group, or the like; an aryl amino group such as a phenyl amino group, a 2-chloroanilino group, or the like; an ureido group such as a phenylureido group, a methylureido group, an N,N-dibutylureido group, or the like; a sulfamoyl amino group such as an N,N-dipropyl sulfamoyl amino group or the like; an alkyl thio group such as a methyl thio group, an octyl thio group, a 2-phenoxyethyl thio group, or the like; an aryl thio group such as a phenyl thio group, a 2-butoxy-5-tert-octylphenyl thio group, a 2-carboxy phenyl thio group, or the like; an alkoxy carbonyl amino group such as a methoxy carbonyl amino group or the like; an alkyl sulfonyl amino group such as a methyl sulfonyl amino group or the like; an aryl sulfonyl amino group such as a phenyl sulfonyl amino group, a p-toluene sulfonyl amino group, or the like; a carbamoyl group such as an N-ethyl carbamoyl group, an N,N-dibutyl carbamoyl group, or the like; a sulfamoyl group such as an N-ethyl sulfamoyl group, an N,N-dipropyl sulfamoyl group, an N-phenyl sulfamoyl group, or the like; a sulfonyl group such as a methyl sulfonyl group, an octyl sulfonyl group, a phenyl sulfonyl group, a p-toluene sulfonyl group, or the like; an alkoxy carbonyl group such as a methoxy carbonyl group, a butyloxy carbonyl group, or the like; a heterocyclic oxy group such as a 1-phenyltetrazol-5-oxy group, a 2-tetrahydropyranyloxy group, or the like; an azo group such as a phenylazo group, a 4-methoxyphenyl azo group, a 4-pivaloylamino phenylazo group, a 2-hydroxy-4-propanoyl phenylazo group, or the like; an acyloxy group such as an acetoxy group or the like; a carbamoyloxy group such as an N-phenylcarbamoyloxy group or the like; a silyloxy group such as a trimethyl silyloxy group, a dibutyl methyl silyloxy group, or the like; an aryloxy carbonyl amino group such as a phenoxy carbonyl amino group or the like; an imide group such as an N-succinimide group, an N-phthalimide group, or the like; a heterocyclic thio group such as a 2-benzothiazolyl thio group, a 2,4-di-phenoxy-1,3,5-triazole-6-thio group, a 2-pyridylthio group, or the like; a sulfinyl group such as a 3-phenoxypropyl sulfinyl group or the like; a phosphonyl group such as a phenoxy phosphonyl group, an octyloxy phosphonyl group, a phenyl phosphonyl group, or the like; an aryloxy carbonyl group such as a phenoxy carbonyl group or the like; an acyl group such as an acetyl group, a 3-phenyl propanoyl group, a benzoyl group, or the like; and an ionic hydrophilic group such as a carboxyl group, a sulfo group, a phosphono group, a quaternary ammonium group, or the like; and the like. The alkyl group, the aralkyl group, the alkenyl group, the alkynyl group, the cycloalkyl group, and the cycloalkenyl group, which are the substituents of the substituted alkyl group, are preferably those having branched chains, and especially preferably those having asymmetric carbons, from the view point of improving the solubility of the dye and the stability of the water-based yellow ink. Out of these, a hydroxy group, an alkoxy group, a cyano group, a halogen atom, a sulfo group (which may also be in the form of a salt), or a carboxyl group (which may also be in the form of a salt) is preferably used as the substituent of the substituted alkyl group.

In the formula (Y-1), the cycloalkyl group includes a substituted or unsubstituted cycloalkyl group. The substituted or unsubstituted cycloalkyl group is preferably a cycloalkyl group having 5 to 30 carbon atoms. The substituent of the substituted cycloalkyl group includes, for example, the substituents described for the substituted alkyl group. The cycloalkyl group includes a cyclohexyl group, a cyclopentyl group, a 4-n-dodecyl cyclohexyl group, and the like.

In the formula (Y-1), the aralkyl group includes a substituted or unsubstituted aralkyl group. The substituted or unsubstituted aralkyl group is preferably an aralkyl group having 7 to 30 carbon atoms. The substituent of the substituted aralkyl group includes, for example, the substituents described for the substituted alkyl group. The aralkyl group includes a benzyl group, a 2-phenethyl group, and the like.

In the formula (Y-1), the alkenyl group is a straight chain, branched, or cyclic substituted or unsubstituted alkenyl group. The alkenyl group is preferably a substituted or unsubstituted alkenyl group having 2 to 30 carbon atoms. The substituent of the substituted alkenyl group includes, for example, the substituents described for the substituted alkyl group. The alkenyl group includes a vinyl group, an allyl group, a prenyl group, a geranyl group, an oleyl group, a 2-cyclopentene-1-yl group, a cyclohexene-1-yl group, and the like.

In the formula (Y-1), the alkynyl group is a substituted or unsubstituted alkynyl group having 2 to 30 carbon atoms. The substituent of the substituted alkynyl group includes, for example, the substituents described for the substituted alkyl group. The alkynyl group includes an ethynyl group, a propargyl group, and the like.

In the formula (Y-1), the aryl group is a substituted or unsubstituted aryl group having 6 to 30 carbon atoms. The aryl group includes a phenyl group, a p-tolyl group, a naphthyl group, an m-chlorophenyl group, an o-hexadecanoyl aminophenyl group, and the like. The substituent of the substituted aryl group includes, for example, the substituents described for the substituted alkyl group.

In the formula (Y-1), the heterocyclic group is a monovalent group obtained by removing one hydrogen atom from a 5- or 6-membered substituted or unsubstituted, aromatic or nonaromatic heterocyclic compound, which may also be further condensed. The heterocyclic group is preferably a 5- or 6-membered aromatic heterocyclic group having 3 to 30 carbon atoms. The substituent of the substituted heterocyclic group includes, for example, the substituents described for the substituted alkyl group. The heterocyclic group includes, with no limitation on a substitution site, a pyridine group, a pyrazine group, a pyridazine group, a pyrimidine group, a triazine group, a quinoline group, an isoquinoline group, a quinazoline group, a cinnoline group, a phthalazine group, a quinoxaline group, a pyrrole group, an indole group, a furan group, a benzofuran group, a thiophene group, a benzothiophene group, a pyrazole group, an imidazole group, a benzimidazole group, a triazole group, an oxazole group, a benzoxazole group, a thiazole group, a benzothiazole group, an isothiazole group, a benzisothiazole group, a thiadiazole group, an isoxazole group, a benzisoxazole group, a pyrrolidine group, a piperidine group, a piperazine group, an imidazolidine group, a thiazoline group, and the like.

In the formula (Y-1), the alkoxy group includes a substituted or unsubstituted alkoxy group. The substituted or unsubstituted alkoxy group is preferably an alkoxy group having 1 to 30 carbon atoms. The substituent of the substituted alkoxy group includes, for example, the substituents described for the substituted alkyl group. The alkoxy group includes a methoxy group, an ethoxy group, an isopropoxy group, an n-octyloxy group, a methoxyethoxy group, a hydroxyethoxy group, a 3-carboxy propoxy group, and the like.

In the formula (Y-1), the aryloxy group is preferably a substituted or unsubstituted aryloxy group having 6 to 30 carbon atoms. The substituent of the substituted aryloxy group includes, for example, the substituents described for the substituted alkyl group. The aryloxy group includes a phenoxy group, a 2-methyl phenoxy group, a 4-tert-butyl phenoxy group, a 3-nitro phenoxy group, a 2-tetradecanoyl amino phenoxy group, and the like.

In the formula (Y-1), the silyloxy group is preferably a silyloxy group having 3 to 20 carbon atoms. The silyloxy group includes a trimethyl silyloxy group, a tert-butyldimethyl silyloxy group, and the like.

In the formula (Y-1), the heterocyclic oxy group is preferably a substituted or unsubstituted heterocyclic oxy group having 2 to 30 carbon atoms. The substituent of the substituted heterocyclic oxy group includes, for example, the substituents described for the substituted alkyl group. The heterocyclic oxy group includes a 1-phenyltetrazol-5-oxy group, a 2-tetrahydropyranyloxy group, and the like.

In the formula (Y-1), the acyloxy group is preferably a formyloxy group, a substituted or unsubstituted alkyl carbonyloxy group having 2 to 30 carbon atoms, or a substituted or unsubstituted aryl carbonyloxy group having 6 to 30 carbon atoms. The substituents of the substituted alkyl carbonyloxy group and the substituted aryl carbonyloxy group include, for example, the substituents described for the substituted alkyl group. The acyloxy group includes a formyloxy group, an acetyloxy group, a pivaloyloxy group, a stearoyloxy group, a benzoyloxy group, a p-methoxyphenyl carbonyloxy group, and the like.

In the formula (Y-1), the carbamoyloxy group is preferably a substituted or unsubstituted carbamoyloxy group having 1 to 30 carbon atoms. The substituent of the substituted carbamoyloxy group includes, for example, the substituents described for the substituted alkyl group. The carbamoyloxy group includes an N,N-dimethyl carbamoyloxy group, an N,N-diethyl carbamoyloxy group, a morpholino carbonyloxy group, an N,N-di-n-octyl amino carbonyloxy group, an N-n-octyl carbamoyloxy group, and the like.

In the formula (Y-1), the alkoxy carbonyloxy group is preferably a substituted or unsubstituted alkoxy carbonyloxy group having 2 to 30 carbon atoms. The substituent of the substituted alkoxy carbonyloxy group includes, for example, the substituents described for the substituted alkyl group. The alkoxy carbonyloxy group includes a methoxy carbonyloxy group, an ethoxy carbonyloxy group, a tert-butoxy carbonyloxy group, an n-octyl carbonyloxy group, and the like.

In the formula (Y-1), the aryloxy carbonyloxy group is preferably a substituted or unsubstituted aryloxy carbonyloxy group having 7 to 30 carbon atoms. The substituent of the substituted aryloxy carbonyloxy group includes, for example, the substituents described for the substituted alkyl group. The aryloxy carbonyloxy group includes a phenoxy carbonyloxy group, a p-methoxyphenoxy carbonyloxy group, a p-n-hexadecyloxy phenoxy carbonyloxy group, and the like.

In the formula (Y-1), the amino group is preferably a substituted or unsubstituted alkylamino group having 1 to 30 carbon atoms, or a substituted or unsubstituted arylamino group having 6 to 30 carbon atoms. The substituents of the substituted alkylamino group and the substituted arylamino group include, for example, the substituents described for the substituted alkyl group. The amino group includes an amino group, a methylamino group, a dimethylamino group, an anilino group, an N-methyl-anilino group, a diphenyl amino group, a hydroxyethylamino group, a carboxyethylamino group, a sulfoethylamino group, a 3,5-dicarboxy anilino group, and the like.

In the formula (Y-1), the acylamino group is preferably a formyl amino group, a substituted or unsubstituted alkyl carbonyl amino group having 1 to 30 carbon atoms, or a substituted or unsubstituted aryl carbonyl amino group having 6 to 30 carbon atoms. The substituents of the substituted alkyl carbonyl amino group and the substituted aryl carbonyl amino group include, for example, the substituents described for the substituted alkyl group. The acylamino group includes a formylamino group, an acetylamino group, a pivaloylamino group, a lauroylamino group, a benzoylamino group, a 3,4,5-tri-n-octyloxyphenyl carbonyl amino group, and the like.

In the formula (Y-1), the amino carbonyl amino group is preferably a substituted or unsubstituted amino carbonyl amino group having 1 to 30 carbon atoms. The substituent of the substituted amino carbonyl amino group includes, for example, the substituents described for the substituted alkyl group. The amino carbonyl amino group includes a carbamoylamino group, an N,N-dimethylamino carbonyl amino group, an N,N-diethylamino carbonyl amino group, a morpholino carbonyl amino group, and the like.

In the formula (Y-1), the alkoxy carbonyl amino group is preferably a substituted or unsubstituted alkoxy carbonyl amino group having 2 to 30 carbon atoms. The substituent of the substituted alkoxy carbonyl amino group includes, for example, the substituents described for the substituted alkyl group. The alkoxy carbonyl amino group includes a methoxy carbonyl amino group, an ethoxy carbonyl amino group, a tert-butoxy carbonyl amino group, an n-octadecyloxy carbonyl amino group, an N-methyl-methoxy carbonyl amino group, and the like.

In the formula (Y-1), the aryloxy carbonyl amino group is preferably a substituted or unsubstituted aryloxy carbonyl amino group having 7 to 30 carbon atoms. The substituent of the substituted aryloxy carbonyl amino group includes, for example, the substituents described for the substituted alkyl group. The aryloxy carbonyl amino group includes a phenoxy carbonyl amino group, a p-chlorophenoxy carbonyl amino group, an m-n-octyloxy phenoxy carbonyl amino group, and the like.

In the formula (Y-1), the sulfamoyl amino group is preferably a substituted or unsubstituted sulfamoyl amino group having 0 to 30 carbon atoms. The substituent of the substituted sulfamoyl amino group includes, for example, the substituents described for the substituted alkyl group. The sulfamoyl amino group includes a sulfamoyl amino group, an N,N-dimethylamino sulfonyl amino group, an N-n-octylamino sulfonylamino group, and the like.

In the formula (Y-1), the alkyl sulfonyl amino group is preferably a substituted or unsubstituted alkyl sulfonyl amino group having 1 to 30 carbon atoms. The substituent of the substituted alkyl sulfonyl amino group includes, for example, the substituents described for the substituted alkyl group. The alkyl sulfonyl amino group includes a methyl sulfonyl amino group, a butyl sulfonyl amino group, and the like.

In the formula (Y-1), the aryl sulfonyl amino group is preferably a substituted or unsubstituted aryl sulfonyl amino group having 6 to 30 carbon atoms. The substituent of the substituted aryl sulfonyl amino group includes, for example, the substituents described for the substituted alkyl group. The aryl sulfonyl amino group includes a phenyl sulfonyl amino group, a 2,3,5-trichlorophenyl sulfonyl amino group, a p-methyl phenyl sulfonyl amino group, and the like.

In the formula (Y-1), the alkyl thio group is preferably a substituted or unsubstituted alkyl thio group having 1 to 30 carbon atoms. The substituent of the substituted alkyl thio group includes, for example, the substituents described for the substituted alkyl group. The alkyl thio group includes a methyl thio group, an ethyl thio group, an n-hexylthio group, and the like.

In the formula (Y-1), the aryl thio group is preferably a substituted or unsubstituted aryl thio group having 6 to 30 carbon atoms. The substituent of the substituted aryl thio group includes, for example, the substituents described for the substituted alkyl group. The aryl thio group includes a phenyl thio group, a p-chlorophenyl thio group, an m-methoxyphenyl thio group, and the like.

In the formula (Y-1), the heterocyclic thio group is preferably a substituted or unsubstituted heterocyclic thio group having 2 to 30 carbon atoms. The substituent of the substituted heterocyclic thio group includes, for example, the substituents described for the substituted alkyl group. The heterocyclic thio group includes a 2-benzothiazolyl thio group, a 1-phenyltetrazole-5-ylthio group, and the like.

In the formula (Y-1), the sulfamoyl group is preferably a substituted or unsubstituted sulfamoyl group having 0 to 30 carbon atoms. The substituent of the substituted sulfamoyl group includes, for example, the substituents described for the substituted alkyl group. The sulfamoyl group includes an N-ethyl sulfamoyl group, an N-(3-dodecyloxy propyl)sulfamoyl group, an N,N-dimethyl sulfamoyl group, an N-acetyl sulfamoyl group, an N-benzoyl sulfamoyl group, an N—(N'-phenyl carbamoyl)sulfamoyl group, and the like.

In the formula (Y-1), the alkyl sulfinyl group is preferably a substituted or unsubstituted alkyl sulfinyl group having 1 to 30 carbon atoms. The substituent of the substituted alkyl sulfinyl group includes, for example, the substituents described for the substituted alkyl group. The alkyl sulfinyl group includes a methyl sulfinyl group, an ethyl sulfinyl group, and the like.

In the formula (Y-1), the aryl sulfinyl group is preferably a substituted or unsubstituted aryl sulfinyl group having 6 to 30 carbon atoms. The substituent of the substituted aryl sulfinyl group includes, for example, the substituents described for the substituted alkyl group. The aryl sulfinyl group includes a phenyl sulfinyl group, a p-methyl sulfinyl group, and the like.

In the formula (Y-1), the alkyl sulfonyl group is preferably a substituted or unsubstituted alkyl sulfonyl group having 1 to 30 carbon atoms. The substituent of the substituted alkyl sulfonyl group includes, for example, the substituents described for the substituted alkyl group. The alkyl sulfonyl group includes a methyl sulfonyl group, an ethyl sulfonyl group, and the like.

In the formula (Y-1), the aryl sulfonyl group is preferably a substituted or unsubstituted aryl sulfonyl group having 6 to 30 carbon atoms. The substituent of the substituted aryl sulfonyl group includes, for example, the substituents described for the substituted alkyl group. The aryl sulfonyl group includes a phenyl sulfonyl group, a p-toluene sulfonyl group, and the like.

In the formula (Y-1), the acyl group is preferably a formyl group, a substituted or unsubstituted alkyl carbonyl group having 2 to 30 carbon atoms, a substituted or unsubstituted aryl carbonyl group having 7 to 30 carbon atoms, or a substituted or unsubstituted heterocyclic carbonyl group having 4 to 30 carbon atoms, bound to a carbonyl group through a carbon atom. The substituents of the substituted alkyl carbonyl group, the substituted aryl carbonyl group, and the substituted heterocyclic carbonyl group include, for example, the substituents described for the substituted alkyl group. The acyl group includes an acetyl group, a pivaloyl group, a 2-chloroacetyl group, a stearoyl group, a benzoyl group, a p-n-octyloxy carbonyl group, a 2-pyridyl carbonyl group, a 2-furyl carbonyl group, and the like.

In the formula (Y-1), the aryloxy carbonyl group is preferably a substituted or unsubstituted aryloxy carbonyl group having 7 to 30 carbon atoms. The substituent of the substituted aryloxy carbonyl group includes, for example, the substituents described for the substituted alkyl group. The aryloxy carbonyl group includes a phenoxy carbonyl group, an o-chlorophenoxy carbonyl group, an m-nitrophenoxy carbonyl group, a p-tert-butyl phenoxy carbonyl group, and the like.

In the formula (Y-1), the alkoxy carbonyl group is preferably a substituted or unsubstituted alkoxy carbonyl group having 2 to 30 carbon atoms. The substituent of the substituted alkoxy carbonyl group includes, for example, the substituents described for the substituted alkyl group. The alkoxy carbonyl group includes a methoxy carbonyl group, an ethoxy carbonyl group, a tert-butoxy carbonyl group, an n-octadecyloxy carbonyl group, and the like.

In the formula (Y-1), the carbamoyl group is preferably a substituted or unsubstituted carbamoyl group having 1 to 30 carbon atoms. The substituent of the substituted carbamoyl group includes, for example, the substituents described for the substituted alkyl group. The carbamoyl group includes a carbamoyl group, an N-methyl carbamoyl group, an N,N-dimethyl carbamoyl group, an N,N-di-n-octyl carbamoyl group, an N-(methylsulfonyl)carbamoyl group, and the like.

In the formula (Y-1), the phosphino group is preferably a substituted or unsubstituted phosphino group having 2 to 30 carbon atoms. The substituent of the substituted phosphino group includes, for example, the substituents described for the substituted alkyl group. The phosphino group includes a dimethyl phosphino group, a diphenyl phosphino group, a methyl phenoxy phosphino group, and the like.

In the formula (Y-1), the phosphinyl group is preferably a substituted or unsubstituted phosphinyl group having 2 to 30 carbon atoms. The substituent of the substituted phosphinyl group includes, for example, the substituents described for the substituted alkyl group. The phosphinyl group includes a phosphinyl group, a dioctyloxy phosphinyl group, a diethoxy phosphinyl group, and the like.

In the formula (Y-1), the phosphinyloxy group is preferably a substituted or unsubstituted phosphinyloxy group having 2 to 30 carbon atoms. The substituent of the substituted phosphinyloxy group includes, for example, the substituents described for the substituted alkyl group. The phosphinyloxy group includes a diphenoxy phosphinyloxy group, a dioctyloxy phosphinyloxy group, and the like.

In the formula (Y-1), the phosphinyl amino group is preferably a substituted or unsubstituted phosphinyl amino group having 2 to 30 carbon atoms. The substituent of the substituted phosphinyl amino group includes, for example, the substituents described for the substituted alkyl group. The phosphinyl amino group includes a dimethoxy phosphinyl amino group, a dimethylamino phosphinyl amino group, and the like.

In the formula (Y-1), the silyl group is preferably a substituted or unsubstituted silyl group having 3 to 30 carbon atoms. The substituent of the substituted silyl group includes, for example, the substituents described for the substituted alkyl group. The silyl group includes a trimethyl silyl group, a tert-butyldimethyl silyl group, a phenyldimethyl silyl group, and the like.

In the formula (Y-1), the azo group includes a phenyl azo group, a 4-methoxyphenyl azo group, a 4-pivaloylamino phenyl azo group, a 2-hydroxy-4-propanoyl phenyl azo group, and the like.

In the formula (Y-1), the imide group includes an N-succinimide group, an N-phthalimide group, and the like.

In the formula (Y-1), $X_1$ and $X_2$ each represent an electron attractive group, and may be identical to or different from each other. The $X_1$ and $X_2$ include an acyl group, an acyloxy group, a carbamoyl group, an alkoxy carbonyl group, an aryloxy carbonyl group, a cyano group, a nitro group, a dialkyl phosphono group, a diaryl phosphono group, a diaryl phosphinyl group, an alkyl sulfinyl group, an aryl sulfinyl group, an alkyl sulfonyl group, an aryl sulfonyl group, a sulfonyloxy group, an acyl thio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted with another electron attractive group, a heterocyclic group, a halogen atom, an azo group, a selenocyanate group, and the like.

In the formula (Y-1), $X_1$ and $X_2$ each preferably represent an acyl group having 2 to 12 carbon atoms, an acyloxy group having 2 to 12 carbon atoms, a carbamoyl group having 1 to 12 carbon atoms, an alkoxy carbonyl group having 2 to 12 carbon atoms, an aryloxy carbonyl group having 7 to 18 carbon atoms, a cyano group, a nitro group, an alkyl sulfinyl group having 1 to 12 carbon atoms, an aryl sulfinyl group having 6 to 18 carbon atoms, an alkyl sulfonyl group having 1 to 12 carbon atoms, an aryl sulfonyl group having 6 to 18 carbon atoms, a sulfamoyl group having 0 to 12 carbon atoms, a halogenated alkyl group having 1 to 12 carbon atoms, a halogenated alkoxy group having 1 to 12 carbon atoms, a halogenated alkylthio group having 1 to 12 carbon atoms, a halogenated aryloxy group having 7 to 18 carbon atoms, an aryl group having 7 to 18 carbon atoms, substituted with two or more other electron attractive groups, or a 5- to 8-membered heterocyclic group having 1 to 18 carbon atoms and having a nitrogen atom, an oxygen atom, or a sulfur atom.

In the formula (Y-1), $Z_1$ and $Z_2$ each represent a hydrogen atom, a substituted or unsubstituted alkyl group, a substituted or unsubstituted alkenyl group, a substituted or unsubstituted alkynyl group, a substituted or unsubstituted aryl group, or a substituted or unsubstituted heterocyclic group, and may be identical to or different from each other. Examples of the alkyl group, the alkenyl group, the alkynyl group, the aryl group, and the heterocyclic group are the same as those described for $R_1$, $R_2$, $Y_1$, and $Y_2$.

In the formula (Y-1), $M_1$ represents a hydrogen atom, alkali metal atom, $NH_4$, or $NR_4$ (wherein R represents an alkyl group or an aryl group). The alkali metal atom is preferably Li, Na or K. The alkyl group and the aryl group in the R are the same as those described for $R_1$, $R_2$, $Y_1$, and $Y_2$. Among these, $M_1$ is preferably Li, Na, K, or $NH_4$.

As for a preferred combination of the substituents of the dye represented by the formula (Y-1), at least one of various substituents is preferably one of the aforementioned preferred groups. More preferably, a larger number of various substituents are the aforementioned preferred groups. Most preferably, all of the substituents are the aforementioned preferred groups.

Particularly preferred combinations of the substituents of the dye represented by the formula (Y-1) include the following (I) to (V).

(I) $R_1$ and $R_2$ may be identical to or different from each other, and preferably represent a substituted or unsubstituted alkyl group having 1 to 12 carbon atoms in total, a substituted or unsubstituted aryl group having 6 to 18 carbon atoms in total, or a substituted or unsubstituted heterocyclic group having 4 to 12 carbon atoms in total. $R_1$ and $R_2$ more preferably represent a straight or branched chain alkyl group having 1 to 8 carbon atoms in total, still more preferably represent a secondary or tertiary alkyl group, and most preferably represent a tert-butyl group.

(II) $X_1$ and $X_2$ each represent an electron attractive group, and may be identical to or different from each other. $X_1$ and $X_2$ preferably represent a cyano group, an alkyl sulfonyl group having 1 to 12 carbon atoms, an aryl sulfonyl group having 6 to 18 carbon atoms, or a sulfamoyl group having 0 to 12 carbon atoms. $X_1$ and $X_2$ more preferably represent a cyano group or an alkyl sulfonyl group having 1 to 12 carbon atoms.

(III) $Y_1$ and $Y_2$ may be identical to or different from each other, and preferably represent a hydrogen atom, a substituted or unsubstituted alkyl group having 1 to 12 carbon atoms in total, a substituted or unsubstituted aryl group having 6 to 18 carbon atoms in total, or a substituted or unsubstituted heterocyclic group having 4 to 12 carbon atoms in total. $Y_1$ and $Y_2$ more preferably represent a hydrogen atom or a substituted or unsubstituted alkyl group. $Y_1$ and $Y_2$ most preferably represent a hydrogen atom.

(IV) $Z_1$ and $Z_2$ may be identical to or different from each other, and preferably represent a substituted or unsubstituted alkyl group having 1 to 12 carbon atoms in total, a substituted or unsubstituted aryl group having 6 to 18 carbon atoms in total, or a substituted or unsubstituted heterocyclic group having 4 to 12 carbon atoms in total. $Z_1$ and $Z_2$ more preferably represent a substituted or unsubstituted aryl group or a substituted or unsubstituted heterocyclic group. $Z_1$ and $Z_2$ still more preferably represent a substituted aryl group.

(V) $M_1$ preferably represents a hydrogen atom, alkali metal atom, $NH_4$ or $NR_4$ (wherein R represents an alkyl group or an aryl group). $M_1$ more preferably represents a hydrogen atom, Li, Na, K, or $NH_4$.

Preferred specific examples of the dye (Y-1) include compounds represented by the following formulae (Y-1a) to (Y-1e).

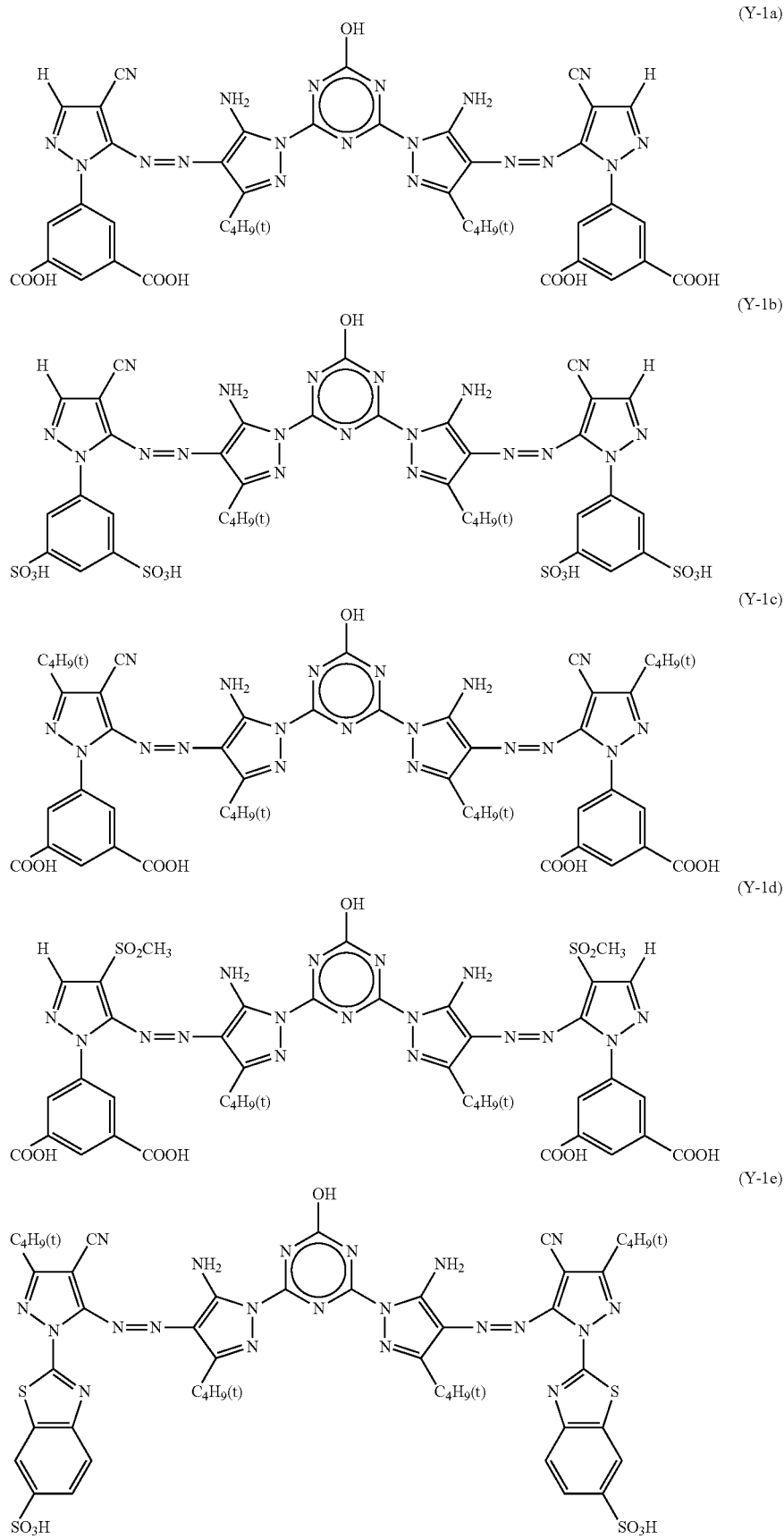

The blending amount of the yellow dye (Y-1) is not particularly limited. By allowing the yellow dye (Y-1) to be contained in the water-based yellow ink, the light resistance and ozone resistance can be improved. The blending amount of the yellow dye (Y-1) is, for example, in a range of 0.1% by weight to 10% by weight, preferably in a range of 1.2% by weight to 5.4% by weight, and more preferably in a range of 1.5% by weight to 4.5% by weight with respect to the entire amount of the water-based yellow ink.

As mentioned above, the yellow dye (Y-2) is at least one dye selected from the group consisting of C. I. Direct Yellow 86, C. I. Direct Yellow 132, and C. I. Direct Yellow 142.

C. I. Direct Yellow 86 is, for example, a dye represented by the following formula (Y-2a).

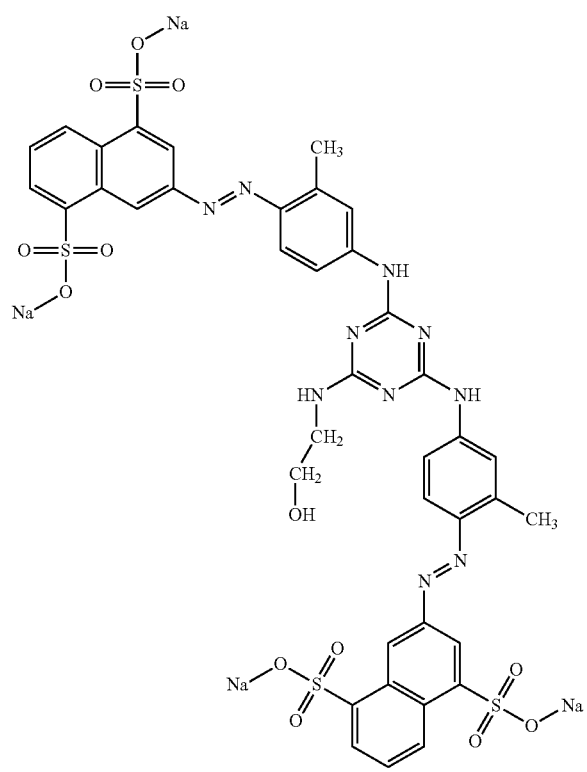

(Y-2a)

C. I. Direct Yellow 132 is, for example, a dye represented by the following formula (Y-2b).

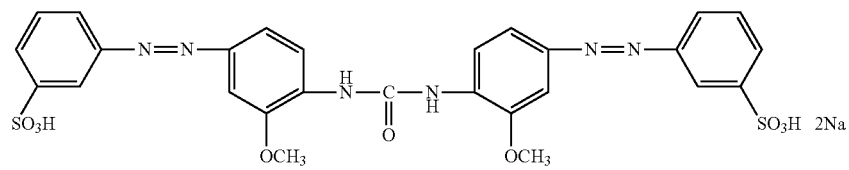

(Y-2b)

C. I. Direct Yellow 142 is, for example, a dye represented by the following formula (Y-2c).

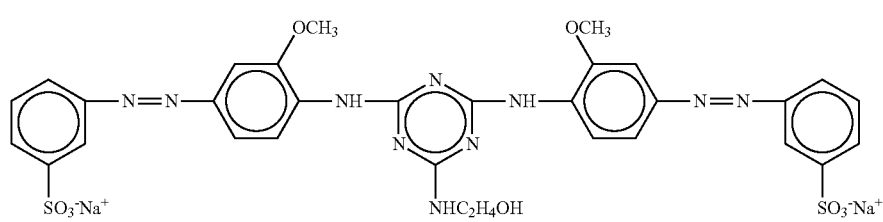

(Y-2c)

The blending amount of the yellow dye (Y-2) is not particularly limited. By allowing the yellow dye (Y-2) to be contained in the water-based yellow ink, the storing stability can be improved. The blending amount of the yellow dye (Y-2) is, for example, in a range of 0.1% by weight to 10% by weight, preferably in a range of 0.2% by weight to 2.4% by weight, and more preferably in a range of 0.4% by weight to 1.6% by weight, with respect to the entire amount of the water-based yellow ink.

The weight ratio of the yellow dye (Y-1) to the yellow dye (Y-2) in the water-based yellow ink is preferably in a range of 60:40 to 90:10 (yellow dye (Y-1): yellow dye (Y-2)). By setting the weight ratio to be in the aforementioned range, it is possible to obtain a water-based yellow ink which is quite satisfactory in both of the storing stability and in the light resistance and ozone resistance.

The entire blending amount of the yellow dye (Y-1) and the yellow dye (Y-2) is not particularly limited, and is preferably in a range of 2% by weight to 6% by weight with respect to the entire amount of the water-based yellow ink. By setting the entire blending amount to be in the aforementioned range, it is possible to obtain a water-based yellow ink which is quite satisfactory in all of the storing stability, the color vividness or brightness, the light resistance, the ozone resistance, and the jetting stability.

The water-based yellow ink may further contain, in addition to the yellow dye, another yellow colorant which is exemplified by a pigment, etc. Alternatively, it is allowable that the water-based yellow ink does not contain the another yellow colorant, in addition to the yellow dye.

The water-based yellow ink may further contain water and water-soluble organic solvent.

The water is preferably ion-exchange water or purified water (pure water). The blending amount of the water with respect to the entire amount of the water-based yellow ink (the proportion of the water in the water-based yellow ink) is, for example, in a range of 10% by weight to 90% by weight, and preferably in a range of 40% by weight to 80% by weight. The proportion of the water in the water-based yellow ink may be, for example, a balance of the other components.

The water-soluble organic solvent includes, for example, a humectant which prevents the water-based yellow ink from drying at a nozzle tip portion of an ink-jet head and a penetrant which adjusts a drying rate of the water-based yellow ink on a recording medium.

The humectant is not particularly limited, and includes lower alcohols such as methyl alcohol, ethyl alcohol, n-propyl alcohol, isopropyl alcohol, n-butyl alcohol, sec-butyl alcohol, tert-butyl alcohol, and the like; amides such as dimethylformamide, dimethylacetamide, and the like; ketones such as acetone and the like; ketoalcohols such as diacetone alcohol and the like; ethers such as tetrahydrofuran, dioxane, and the like; polyethers such as polyalkylene glycol, and the like; polyalcohols such as alkylene glycol, glycerin, trimethylolpropane, and the like; 2-pyrrolidone; N-methyl-2-pyrrolidone; 1,3-dimethyl-2-imidazolidinone; and the like. The polyalkylene glycol includes polyethylene glycol, polypropylene glycol, and the like. The alkylene glycol includes ethylene glycol, propylene glycol, butylene glycol, diethylene glycol, triethylene glycol, dipropylene glycol, tripropylene glycol, thiodiglycol, hexylene glycol, and the like. These humectants may be used alone or in a combination of two or more of them. Out of these, the humectant is preferably polyalcohol such as alkylene glycol, glycerin, or the like.

The blending amount of the humectant with respect to the entire amount of the water-based yellow ink is, for example, in a range of 0% by weight to 95% by weight, preferably in a range of 5% by weight to 80% by weight, and more preferably in a range of 5% by weight to 50% by weight.

The penetrant includes glycol ethers and the like. The glycol ethers includes ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, and the like. The penetrants may be used alone or in a combination of two or more of them.

The blending amount of the penetrant with respect to the entire amount of the water-based yellow ink is, for example, in a range of 0% by weight to 20% by weight, preferably in a range of 0.1% by weight to 15% by weight, and more preferably in a range of 0.5% by weight to 10% by weight.

The water-based yellow ink may further contain a conventionally known additive as required. The additive includes a surfactant, a pH adjuster, a viscosity modifier, a surface tension modifier, a mildew proofing agent, and the like. The viscosity modifier includes polyvinyl alcohol, cellulose, a water-soluble resin, and the like.

The water-based yellow ink can be prepared, for example, by uniformly mixing the above-described yellow dye with other addition components as required by a conventionally known method, and then removing any non-dissolved matter, etc. with a filter etc.

[Water-Based Magenta Ink]

As described above, the water-based magenta ink contains the magenta dye and the hue angle ∠H° of the water-based magenta ink is in a range of 0° to 5° or in a range of 345° to 360°. There is no particular limitation to the composition of the water-based magenta ink, provided that the water-based magenta ink contains the magenta dye and the hue angle ∠H° of the water-based magenta ink is in the range of 0° to 5° or in the range of 345° to 360°.

The magenta dye preferably include a magenta dye (M-1) and a magenta dye (M-2) as described below:

magenta dye (M-1): a dye represented by the following formula (M-1); and magenta dye (M-2): at least one dye selected from the group consisting of a dye represented by the formula (M-2a), a dye represented as the formula (M-2b) or a salt thereof, C. I. Acid Red 1, and C. I. Acid Red 254:

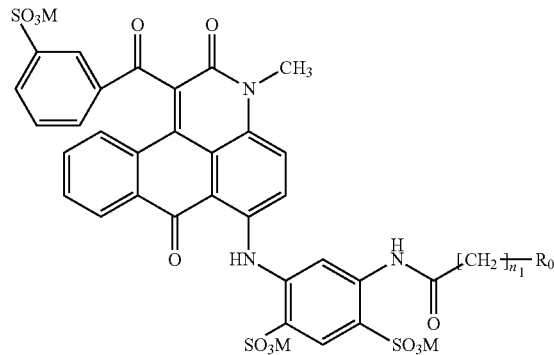

(M-1)

wherein in the formula (M-1), $n_1$ is 1 or 2;

three Ms each represent sodium or ammonium ($NH_4$), and may be identical to or different from one another; and $R_0$ represents a monoalkylamino group having 1 to 8 carbon atoms, substituted with a carboxyl group,

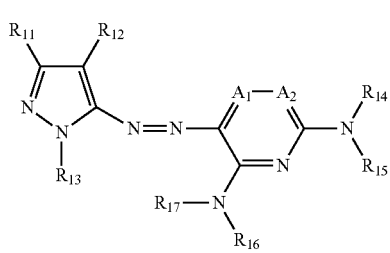

(M-2a)

wherein in the formula (M-2a), $R_{11}$ represents a hydrogen atom, a substituted or unsubstituted alkyl group, or a substituted or unsubstituted aryl group;

$R_{12}$ represents a hydrogen atom, a halogen atom, or a cyano group;

$R_{13}$ represents a hydrogen atom, a substituted or unsubstituted alkyl group, a substituted or unsubstituted aryl group, or a substituted or unsubstituted heterocyclic group;

$R_{14}$, $R_{15}$, $R_{16}$, and $R_{17}$ each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, and $R_{14}$, $R_{15}$, $R_{16}$, and $R_{17}$ may be identical to or different from one another, not both of $R_{14}$ and $R_{15}$ are hydrogen atoms, and not both of $R_{16}$ and $R_{17}$ are hydrogen atoms; and $A_1$ and $A_2$ are both substituted or unsubstituted carbon atoms, or one of $A_1$ and $A_2$ is a substituted or unsubstituted carbon atom and the other is a nitrogen atom,

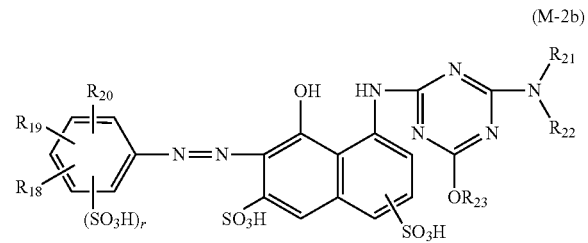

(M-2b)

wherein in the formula (M-2b), r is 0, 1, or 2;

$R_{18}$, $R_{19}$, and $R_{20}$ each represent a substituted or unsubstituted alkyl group, a substituted or unsubstituted alkoxy group, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonic acid ester group, a substituted or unsubstituted alkylsulfonyl group, a substituted or unsubstituted arylsulfonyl group, a carboxyl group, or a carboxylic acid ester group, and $R_{18}$, $R_{19}$, and $R_{20}$ may be identical to or different from one another; and $R_{21}$, $R_{22}$, and $R_{23}$ each represent a hydrogen atom, a substituted or unsubstituted alkyl group, a substituted or unsubstituted alkenyl group, a substituted or unsubstituted aryl group, a substituted or unsubstituted alicyclic group, or a substituted or unsubstituted heterocyclic group, and $R_{21}$, $R_{22}$, and $R_{23}$ may be identical to or different from one another.

A compound represented by the formula (M-1) may be a compound in which all of the three Ms are sodium (sodium salts), a compound in which all of the three Ms are ammonium (ammonium salts), or a compound in which one or two of the three Ms are sodium and the other(s) is(are) ammonium. The magenta dye (M-1) may be composed of one of the aforementioned compounds or may be a mixture containing two or more of the aforementioned compounds. Each of the Ms may be ionized in a water-based magenta ink to become an ion (at least one of $Na^+$ and $NH_4^+$).

The dye represented by the formula (M-1) can be produced by, for example, the method disclosed in U.S. Pat. No. 8,603,232 the disclosure of which is incorporated herein by reference in its entirety, as constituting a portion of the present specification.

Preferred specific examples of the magenta dye (M-1) include compounds represented by the magenta dyes (M-1a) to (M-1e) that are summarized in TABLE 1.

TABLE 1

| | $n_1$ | M | $R_0$ |
|---|---|---|---|
| Magenta dye (M-1a) | 1 | Mixture of Na and $NH_4$ | —$NHCH_2COOH$ |
| Magenta dye (M-1b) | 1 | Mixture of Na and $NH_4$ | —$NH(CH_2)_5COOH$ |
| Magenta dye (M-1c) | 1 | Mixture of Na and $NH_4$ | —$NH(CH_2)_7COOH$ |
| Magenta dye (M-1d) | 2 | Mixture of Na and $NH_4$ | —$NHCH_2COOH$ |
| Magenta dye (M-1e) | 2 | Mixture of Na and $NH_4$ | —$NH(CH_2)_5COOH$ |

As mentioned above, the magenta dye (M-2) is at least one dye selected from the group consisting of a dye represented by the formula (M-2a), a dye represented by the formula (M-2b) or a salt thereof, C. I. Acid Red 1, and C. I. Acid Red 254.

In the formula (M-2a), the substituted or unsubstituted alkyl group is preferably an alkyl group having 1 to 6 carbon atoms. The substituted or unsubstituted alkyl group includes a methyl group, an ethyl group, an n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, and the like. A substituent of the substituted alkyl group includes a hydroxyl group; an alkoxy group such as a methoxy group, an ethoxy group, or the like; a cyano group; a halogen atom such as a fluorine atom, a chlorine atom, a bromine atom, an iodine atom, or the like; an ionic hydrophilic group such as a carboxylate, a sulfonate, or the like; and the like.

In the formula (M-2a), the substituted or unsubstituted aryl group is preferably an aryl group having 6 to 12 carbon atoms. However, in the case of the substituted aryl group, the number of carbon atoms does not include the number of carbon atoms of its substituent(s). The substituted or unsubstituted aryl group includes a phenyl group, a naphthyl group, a p-tolyl group, a p-octylphenyl group, a mesityl group, a p-methoxyphenyl group, an o-chlorophenyl group, an m-(3-sulfopropylamino)phenyl group, and the like. The substituent of the substituted aryl group includes an alkyl group such as a methyl group, an ethyl group, an isopropyl group, a tert-butyl group, a n-octyl group, or the like; the same alkoxy group as that described above; the same halogen atom as that described above; an alkylamino group such as a methylamino group, a dimethylamino group, or the like; an amide group; a carbamoyl group; a sulfamoyl group; a sulfoamide group; a hydroxyl group; an ester group such as a methoxycarbonyl group, an ethoxycarbonyl group, or the like; the same ionic hydrophilic group as that described above; and the like.

In the formula (M-2a), the halogen atom includes a fluorine atom, a chlorine atom, a bromine atom, an iodine atom, and the like.

In the formula (M-2a), the substituted or unsubstituted heterocyclic group is preferably a 5- or 6-membered heterocyclic group. The substituted or unsubstituted heterocyclic group includes a 2-pyridyl group, a 2-thienyl group, a 2-thiazolyl group, a 2-benzothiazolyl group, a 2-furyl group, a 6-sulfobenzothiazolyl group, a 6-sulfonate benzothiazolyl group, and the like. The substituent of the substituted heterocyclic group includes an amide group, a carbamoyl group, a sulfamoyl group, a sulfoamide group, a hydroxyl group, the same ester group as that described above, the same ionic hydrophilic group as that described above, and the like.

In the formula (M-2a), the substituted or unsubstituted sulfonyl group includes a methylsulfonyl group, a phenylsulfonyl group, and the like. The substituent of the substituted sulfonyl group includes the same substituted or unsubstituted alkyl group as that described above, the same substituted or unsubstituted aryl group as that described above, and the like.

In the formula (M-2a), the substituted or unsubstituted acyl group is preferably an acyl group having 1 to 12 carbon atoms. However, in the case of the substituted acyl group, the number of carbon atoms does not include the number of carbon atoms of its substituent(s). The substituted or unsubstituted acyl group includes an acetyl group, a benzoyl group, a chloroacetyl group, and the like. The substituent of the substituted acyl group includes, for example, the same ionic hydrophilic group as that described above.

As described above, in the formula (M-2a), $A_1$ and $A_2$ are both substituted or unsubstituted carbon atoms, or one of $A_1$ and $A_2$ is a substituted or unsubstituted carbon atom and the other is a nitrogen atom. $A_1$ and $A_2$ are both preferably carbon atoms, in view of the fact that better performance can be obtained. The substituent bonded to the carbon atoms $A_1$ and $A_2$ includes an alkyl group having 1 to 3 carbon atoms, a carboxyl group, a carbamoyl group, a cyano group, and the like.

As described above, in the formula (M-2a), $R_{14}$ and $R_{15}$ are not both hydrogen atoms and $R_{16}$ and $R_{17}$ are not both hydrogen atoms. Moreover, in the formula (M-2a), the water solubility of the dye tends to be improved as the number of substitutions by a sulfonic acid group or a carboxyl group is increased. Therefore, the number of these substitutions is preferably adjusted in accordance with needs.

The dye represented by the formula (M-2a) can be produced by, for example, the method disclosed in U.S. Pat. No. 8,603,232 the disclosure of which is incorporated herein by reference in its entirety, as constituting a portion of the present specification.

One preferred magenta dye (M-2a) is, for example, an aspect wherein in the formula (M-2a), $R_{11}$ is an alkyl group; $R_{12}$ is a cyano group; $R_{13}$ is a hydrogen atom or a substituted or unsubstituted heterocyclic group; $R_{14}$ is a hydrogen atom, a substituted or unsubstituted heterocyclic group or a substituted aryl group; $R_{15}$ and $R_{16}$ each are a substituted heterocyclic group or a substituted aryl group; $R_{17}$ is a hydrogen atom; $A_1$ is a substituted carbon atom; and $A_2$ is a substituted or unsubstituted carbon atom.

A more preferred magenta dye (M-2a) is, for example, an aspect wherein in the formula (M-2a), $R_{11}$ is a tert-butyl group; $R_{12}$ is a cyano group; $R_{13}$ is a hydrogen atom or a benzothiazolyl group (preferably, a benzothiazole-2-yl group) optionally substituted by a sulfonic acid group or an alkali metal sulfonate group; $R_{14}$ is a hydrogen atom, a benzothiazolyl group (preferably, a benzothiazole-2-yl group) optionally substituted by a sulfonic acid group or an alkali metal sulfonate group, or a trialkylphenyl group (preferably, a mesityl group) substituted by a sulfonic acid group or an alkali metal sulfonate group; $R_{15}$ and $R_{16}$ each are a monoalkylphenyl group, a dialkylphenyl group, or a trialkylphenyl group (preferably, a p-octylphenyl group or a mesityl group) optionally substituted by a sulfonic acid group or an alkali metal sulfonate group or a benzothiazolyl group (preferably, a benzothiazole-2-yl group) substituted by a sulfonic acid group or an alkali metal sulfonate group; $R_{17}$ is a hydrogen atom; $A_1$ is a substituted carbon atom; and $A_2$ is a carbon atom optionally substituted by a cyano group.

Preferred specific examples of the magenta dye (M-2a) include compounds represented by the formulae (M-2a-1) to (M-2a-6).

(M-2a-1)

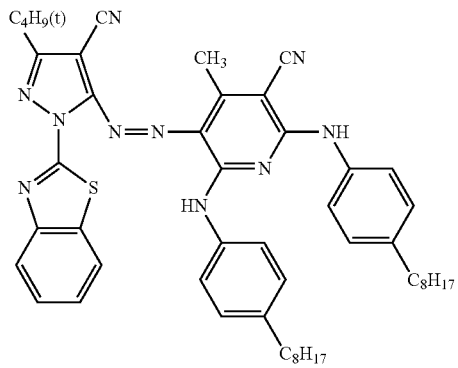

The compound represented by the formula (M-2a-1) is an aspect wherein in the formula (M-2a), $R_{11}$ is a tert-butyl group; $R_{12}$ is a cyano group; $R_{13}$ is a benzothiazole-2-yl group; $R_{14}$ is a hydrogen atom; $R_{15}$ and $R_{16}$ each are a p-octylphenyl group; $R_{17}$ is a hydrogen atom; $A_1$ is a carbon atom substituted by a methyl group; and $A_2$ is a carbon atom substituted by a cyano group.

(M-2a-2)

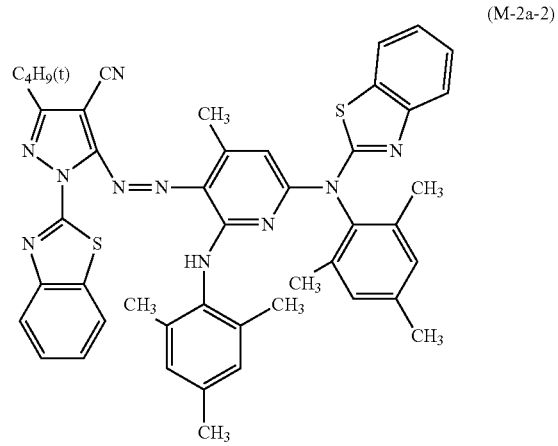

The compound represented by the formula (M-2a-2) is another aspect wherein in the formula (M-2a), $R_{11}$ is a tert-butyl group; $R_{12}$ is a cyano group; $R_{13}$ and $R_{14}$ each are a benzothiazole-2-yl group; $R_{15}$ and $R_{16}$ each are a mesityl group; $R_{17}$ is a hydrogen atom; $A_1$ is a carbon atom substituted by a methyl group; and $A_2$ is a carbon atom.

(M-2a-3)

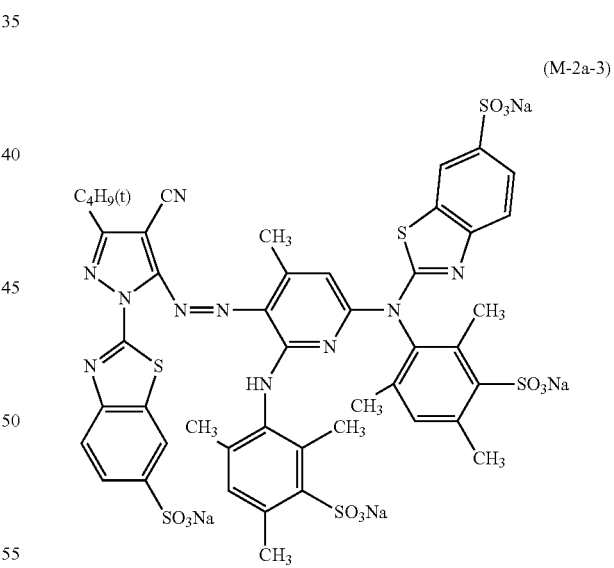

The compound represented by the formula (M-2a-3) is still another aspect wherein in the formula (M-2a), $R_{11}$ is a tert-butyl group; $R_{12}$ is a cyano group; $R_{13}$ and $R_{14}$ each are a 6-sodium sulfonate benzothiazole-2-yl group; $R_{15}$ and $R_{16}$ each are a 3-sodium sulfonate mesityl group; $R_{17}$ is a hydrogen atom; $A_1$ is a carbon atom substituted by a methyl group; and $A_2$ is a carbon atom.

(M-2a-4)

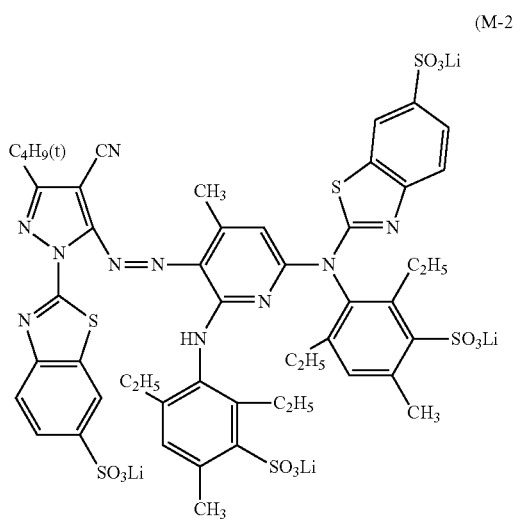

The compound represented by the formula (M-2a-4) is yet another aspect wherein in the formula (M-2a), $R_{11}$ is a tert-butyl group; $R_{12}$ is a cyano group; $R_{13}$ and $R_{14}$ each are a 6-lithium sulfonate benzothiazole-2-yl group; $R_{15}$ and $R_{16}$ each are a 2,6-diethyl-4-methyl-3-lithium sulfonate phenyl group; $R_{17}$ is a hydrogen atom; $A_1$ is a carbon atom substituted by a methyl group; and $A_2$ is a carbon atom.

(M-2a-5)

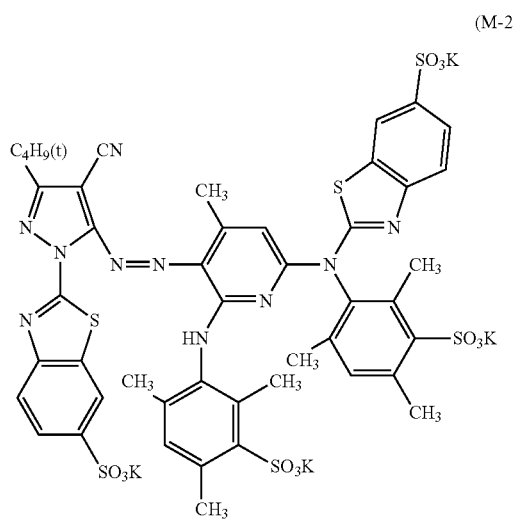

The compound represented by the formula (M-2a-5) is yet another aspect wherein in the formula (M-2a), $R_{11}$ is a tert-butyl group; $R_{12}$ is a cyano group; $R_{13}$ and $R_{14}$ each are a 6-potassium sulfonate benzothiazole-2-yl group; $R_{15}$ and $R_{16}$ each are a 3-potassium sulfonate mesityl group; $R_{17}$ is a hydrogen atom; $A_1$ is a carbon atom substituted by a methyl group; and $A_2$ is a carbon atom.

(M-2a-6)

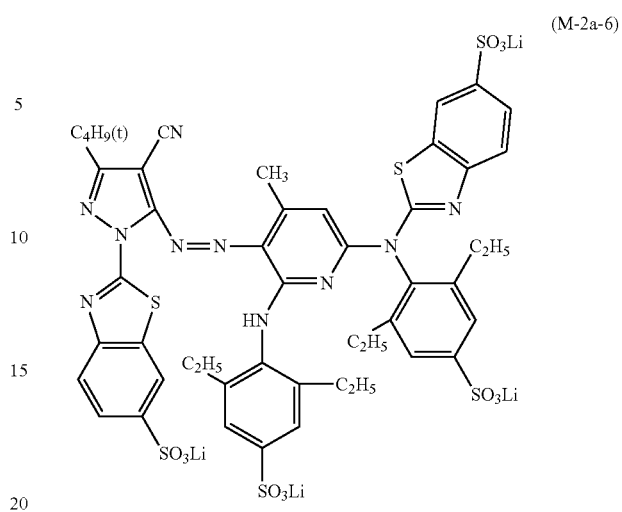

The compound represented by the formula (M-2a-6) is yet another aspect wherein in the formula (M-2a), $R_{11}$ is a tert-butyl group; $R_{12}$ is a cyano group; $R_{13}$ and $R_{14}$ each are a 6-lithium sulfonate benzothiazole-2-yl group; $R_{15}$ and $R_{16}$ each are a 2,6-diethyl-4-lithium sulfonate phenyl group; $R_{17}$ is a hydrogen atom; $A_1$ is a carbon atom substituted by a methyl group; and $A_2$ is a carbon atom.

In a case that the magenta dye (M-2) is the magenta dye (M-2a), it is possible to improve the light resistance, ozone resistance and jetting stability by blending the magenta dye (M-1) to the water-based magenta ink. In this case, the blending amount of the magenta dye (M-1) is not particularly limited; the blending amount is, for example, in a range of 0.1% by weight to 10% by weight, preferably in a range of 0.4% by weight to 3.6% by weight, more preferably in a range of 0.8% by weight to 3% by weight, with respect to the entire amount of the water-based magenta ink.

In a case that the magenta dye (M-2) is the magenta dye (M-2a), it is possible to improve the color vividness, light resistance and ozone resistance by blending the magenta dye (M-2) to the water-based magenta ink. In this case, the blending amount of the magenta dye (M-2) is not particularly limited; the blending amount is, for example, in a range of 0.1% by weight to 10% by weight, preferably in a range of 0.8% by weight to 4.8% by weight, more preferably in a range of 1.0% by weight to 3.2% by weight, with respect to the entire amount of the water-based magenta ink.

In a case that the magenta dye (M-2) is the magenta dye (M-2a), the weight ratio of the magenta dye (M-1) to the magenta dye (M-2) in the water-based magenta ink is preferably in a range of 60:40 to 20:80 (magenta dye (M-1): magenta dye (M-2)). By setting the weight ratio to be in the aforementioned range, it is possible to obtain a water-based magenta ink which is quite satisfactory in both of the color vividness and the jetting stability.

In the formula (M-2b), the substituted or unsubstituted alkyl group of each of $R_{18}$, $R_{19}$, and $R_{20}$ is preferably an alkyl group having 1 to 9 carbon atoms in total. The substituted or unsubstituted alkyl group includes a methyl group, an ethyl group, an n-propyl group, an isopropyl group, an n-butyl group, a trifluoromethyl group, a dimethylaminomethyl group, and the like. The substituent of the substituted alkyl group includes a hydroxyl group; an alkoxy group such as a methoxy group, an ethoxy group, or the like; a cyano group; a halogen atom such as a fluorine atom, a chlorine atom, a bromine atom, an iodine atom, or the like; an ionic hydrophilic group such as a carboxylate, a sulfonate, or the like; and the like.

In the formula (M-2b), the substituted or unsubstituted alkoxy group of each of $R_{18}$, $R_{19}$, and $R_{20}$ is preferably an alkoxy group having 1 to 9 carbon atoms in total. The substituted or unsubstituted alkoxy group includes a methoxy group, an isopropoxy group, an n-butoxy group, and the like.

In the formula (M-2b), the halogen atom of $R_{18}$, $R_{19}$, and $R_{20}$ includes a fluorine atom, a chlorine atom, a bromine atom, an iodine atom, and the like.

In the formula (M-2b), the substituted or unsubstituted carbamoyl group of $R_{18}$, $R_{19}$, and $R_{20}$ includes a carbamoyl group, an N,N-dimethylcarbamoyl group, a phenylcarbamoyl group, and the like.

In the formula (M-2b), the substituted or unsubstituted sulfamoyl group of $R_{18}$, $R_{19}$, and $R_{20}$ includes a sulfamoyl group, an N-methylsulfamoyl group, an N-ethylsulfamoyl group, an N-ethyl-N-phenylsulfamoyl group, an N,N-dimethylsulfamoyl group, a p-carboxyphenylsulfamoyl group, and the like.

In the formula (M-2b), the substituted or unsubstituted amino group of $R_{18}$, $R_{19}$, and $R_{20}$ includes an N-methylamino group, a carbamoylamino group, an N,N-diethylamino group, an acetylamino group, and the like.

In the formula (M-2b), the sulfonate ester group of $R_{18}$, $R_{19}$, and $R_{20}$ includes a phenoxysulfonyl group and the like.

In the formula (M-2b), the substituted or unsubstituted alkylsulfonyl group of $R_{18}$, $R_{19}$, and $R_{20}$ is preferably an alkylsulfonyl group having 1 to 9 carbon atoms in total. The substituted or unsubstituted alkylsulfonyl group includes a hydroxysulfonyl group and the like.

In the formula (M-2b), the substituted or unsubstituted arylsulfonyl group of $R_{18}$, $R_{19}$, and $R_{20}$ is preferably an arylsulfonyl group having 6 to 15 carbon atoms in total. The substituted or unsubstituted arylsulfonyl group includes a benzylsulfonyl group and the like.

In the formula (M-2b), the carboxylate ester group of $R_{18}$, $R_{19}$, and $R_{20}$ includes a methoxycarbonyl group and the like.

In the formula (M-2b), the substituted or unsubstituted alkyl group of $R_{21}$, $R_{22}$, and $R_{23}$ is preferably an alkyl group having 1 to 18 carbon atoms in total. The substituted or unsubstituted alkyl group includes an ethyl group, an n-butyl group, an n-octyl group, an ethylhexyl group, a hydroxyethyl group, a carboxypropyl group, a carboxycyclohexylmethyl group, a 1-carboxy-2-mercaptoethyl group, a 1-carboxy-2-carbamoyl-ethyl group, a 1-isopropyl-1-carboxymethyl group, a 1,2-dicarboxypropyl group, and the like. The substituent of the substituted alkyl group includes a hydroxyl group; an alkoxy group such as a methoxy group, an ethoxy group, or the like; a cyano group; a halogen atom such as a fluorine atom, a chlorine atom, a bromine atom, an iodine atom, or the like; an ionic hydrophilic group such as a carboxylate, a sulfonate, or the like; and the like.

In the formula (M-2b), the substituted or unsubstituted alkenyl group of $R_{21}$, $R_{22}$, and $R_{23}$ is preferably an alkenyl group having 2 to 18 carbon atoms in total. The substituted or unsubstituted alkenyl group includes a 2-methyl-1-propenyl group, a vinyl group, an allyl group, and the like.

In the formula (M-2b), the substituted or unsubstituted aryl group of $R_{21}$, $R_{22}$, and $R_{23}$ includes a 3,4-dicarboxyphenyl group, a 4-butylphenyl group, a 4-carboxyphenyl group, and the like. The substituent of the substituted aryl group includes, for example, the substituents described for the substituted alkyl group.

In the formula (M-2b), $R_{21}$, $R_{22}$, and $R_{23}$ may include a benzyl group, a 1-carboxy-2-phenyl-ethyl group, a 1-carboxy-2-hydroxyphenylethyl group, a 4-carboxybenzyl group, and the like.

In the formula (M-2b), the substituted or unsubstituted alicyclic group of $R_{21}$, $R_{22}$, and $R_{23}$ includes a cyclohexyl group, a 4-carboxycyclohexyl group, and the like.

In the formula (M-2b), the substituted or unsubstituted heterocyclic group of $R_{21}$, $R_{22}$, and $R_{23}$ includes a pyridyl group, a thiadiazolyl group, a benzothiazolyl group, a 2,2,6,6-tetramethylpiperidinyl group, and the like. The substituent of the substituted heterocyclic group includes, for example, the substituents described for the substituted alkyl group.

In the formula (M-2b), at least one of $R_{21}$, $R_{22}$, and $R_{23}$ may be an alkyl group, an alkenyl group, an aryl group, an alicyclic group, or a heterocyclic group substituted by one to four carboxyl group(s) or sulfamoyl group(s).

In the formula (M-2b), $R_{21}$ and $R_{22}$ may each be a hydrogen atom or a tri-substituted phenyl group, and $R_{21}$ and $R_{22}$ may be identical to or different from each other. Here, three substituents of the tri-substituted phenyl group each are a hydrogen atom, a halogen atom, a hydroxyl group, a substituted or unsubstituted alkyl group having 1 to 9 carbon atoms in total, a substituted or unsubstituted alkoxy group having 1 to 9 carbon atoms in total, a substituted or unsubstituted carbamoyl group, a substituted or unsubstituted sulfamoyl group, a substituted or unsubstituted amino group, a nitro group, a sulfonate ester group, or a carboxylate ester group. The aforementioned three substituents may be identical to or different from each other.

A preferred magenta dye (M-2b) is, for example, an aspect wherein in the formula (M-2b), at least one of $R_{21}$, $R_{22}$, and $R_{23}$ is an alkyl group, an alkenyl group, an aryl group, an aralkyl group, or a cyclohexyl group substituted by one to four carboxyl group(s) or sulfamoyl group(s).

With respect to the magenta dye (M-2b), the number of sulfonic acid groups, carboxyl groups, and/or these salts contained in its structure is preferably six or less in total, more preferably five or less in total, and much more preferably four or less in total. Furthermore, the magenta dye (M-2b) may be used in a free acid form. However, when the magenta dye (M-2b) is obtained in a salt form at the time of producing, it may be used without conversion or may be converted into a desired salt form. Moreover, with respect to the magenta dye (M-2b), a part of the acid groups may be in a salt form, and both a salt-form dye and a free acid-form dye may be present. Such a salt form includes salts of alkali metals such as Na, Li, K, and the like; salts of ammonium optionally substituted by an alkyl group or a hydroxyalkyl group; salts of organic amines; and the like. The organic amine includes a lower alkylamine, a hydroxy-substituted lower alkylamine, a carboxy-substituted lower alkylamine, a polyamine having 2 to 10 alkyleneimine units each having 2 to 4 carbon atoms, and the like. The number of the types of these salts used is not limited to 1, but a plurality of types of the salts may be present.

Another preferred aspect of the magenta dye (M-2b) is, for example, an aspect wherein in the formula (M-2b):

r is 0;

$R_{18}$ is a carboxyl group, a carbamoyl group, a trifluoromethyl group, or a sulfamoyl group;

$R_{19}$, $R_{20}$, and $R_{22}$ each are a hydrogen atom;

$R_{21}$ is a phenyl group optionally substituted by a carboxyl group or a sulfamoyl group, or a carboxy alkyl group; and $R_{23}$ is a hydrogen atom or an alkyl group.

The dye represented by the formula (M-2b) or the salt thereof can be produced by, for example, the method disclosed in U.S. Pat. No. 8,603,232 the disclosure of which is incorporated herein by reference in its entirety, as constituting a portion of the present specification.

Preferred specific examples of the magenta dye (M-2b) or a salt thereof include compounds represented by the following formulae (M-2b-1) to (M-2b-5).

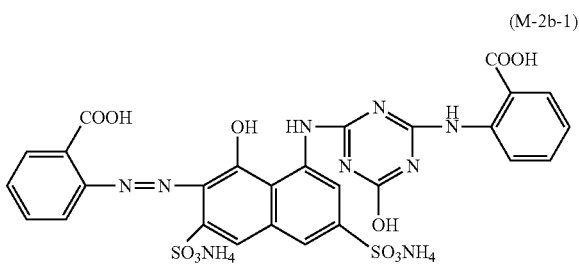
(M-2b-1)

The compound represented by the formula (M-2b-1) is a compound wherein in the formula (M-2b), r is 0;

$R_{18}$ is a carboxyl group at the 2-position of a phenyl group bonded to an azo group;

$R_{19}$, $R_{20}$ and $R_{22}$ each are a hydrogen atom;

$R_{21}$ is a 2-carboxyphenyl group; and $R_{23}$ is a hydrogen atom.

In the compound represented by the formula (M-2b-1), sulfonic acids at the 3-position and 6-position of a naphthalene ring are ammonium salts.

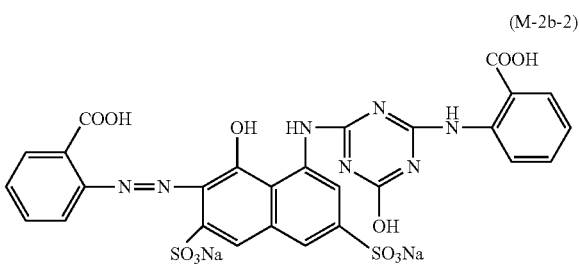
(M-2b-2)

In the compound represented by the formula (M-2b-2), r is 0;

$R_{18}$ is a carbamoyl group at the 2-position of a phenyl group bonded to an azo group;

$R_{19}$, $R_{20}$ and $R_{22}$ each are a hydrogen atom;

$R_{21}$ is a 2-carboxyphenyl group; and $R_{23}$ is a hydrogen atom.

In the compound represented by the formula (M-2b-2), sulfonic acids at the 3-position and 6-position of a naphthalene ring are sodium salts.

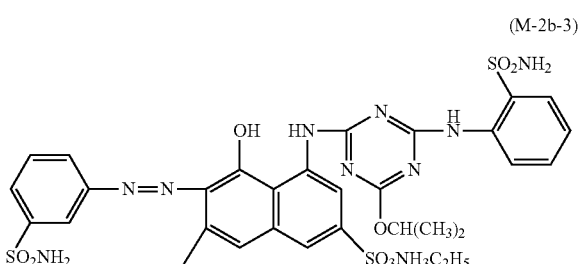
(M-2b-3)

In the compound represented by the formula (M-2b-3), r is 0;

$R_{18}$ is a sulfamoyl group at the 3-position of a phenyl group bonded to an azo group;

$R_{19}$, $R_{20}$ and $R_{22}$ each are a hydrogen atom;

$R_{21}$ is a 2-sulfamoylphenyl group; and $R_{23}$ is an isopropyl group.

In the compound represented by the formula (M-2b-3), sulfonic acids at the 3-position and 6-position of a naphthalene ring are ethylammonium salts.

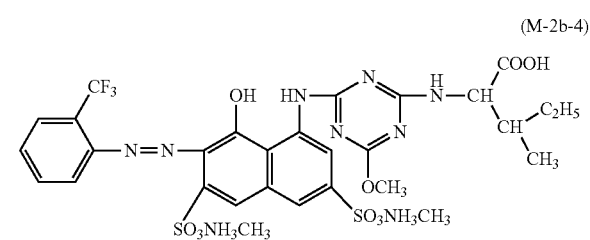
(M-2b-4)

In the compound represented by the formula (M-2b-4), r is 0;

$R_{18}$ is a trifluoromethyl group at the 2-position of a phenyl group bonded to an azo group;

$R_{19}$, $R_{20}$ and $R_{22}$ each are a hydrogen atom;

$R_{21}$ is a 1-carboxy-2-methylbutyl group; and $R_{23}$ is a methyl group.

In the compound represented by the formula (M-2b-4), sulfonic acids at the 3-position and 6-position of a naphthalene ring are methylammonium salts.

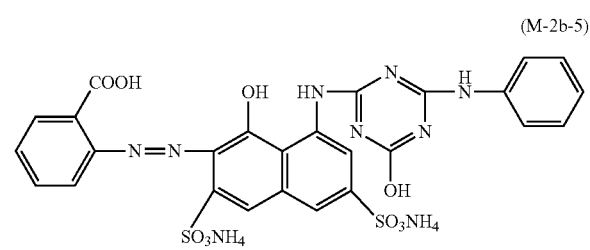
(M-2b-5)

In the compound represented by the formula (M-2b-5), r is 0;

$R_{18}$ is a carboxyl group at the 2-position of a phenyl group bonded to an azo group;

$R_{19}$, $R_{20}$ and $R_{22}$ each are a hydrogen atom;

$R_{21}$ is a phenyl group; and $R_{23}$ is a hydrogen atom.

In the compound represented by the formula (M-2b-5), sulfonic acids at the 3-position and 6-position of a naphthalene ring are ammonium salts.

C. I. Acid Red 1 is, for example, a dye represented by the following formula (M-2c).

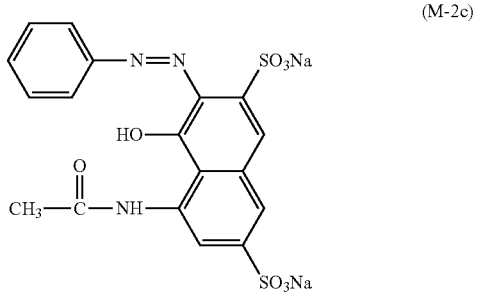

(M-2c)

In a case that the magenta dye (M-2) is at least one dye selected from the group consisting of the magenta dye (M-2b) or a salt thereof, C. I. Acid Red 1 and C. I. Acid Red 254, it is possible to improve the light resistance and ozone resistance by blending the magenta dye (M-1) to the water-based magenta ink. In this case, the blending amount of the magenta dye (M-1) is not particularly limited; the blending amount is, for example, in a range of 0.1% by weight to 10% by weight, preferably in a range of 1.4% by weight to 5.4% by weight, with respect to the entire amount of the water-based magenta ink.

In a case that the magenta dye (M-2) is at least one dye selected from the group consisting of the magenta dye (M-2b) or the salt thereof, C. I. Acid Red 1 and C. I. Acid Red 254, it is possible to improve the color vividness by blending the magenta dye (M-2) to the water-based magenta ink. In this case, the blending amount of the magenta dye (M-2) is not particularly limited; the blending amount is, for example, in a range of 0.05% by weight to 5% by weight, preferably in a range of 0.2% by weight to 1.8% by weight, with respect to the entire amount of the water-based magenta ink.

In a case that the magenta dye (M-2) is at least one dye selected from the group consisting of the magenta dye (M-2b) or the salt thereof, C. I. Acid Red 1 and C. I. Acid Red 254, the weight ratio of the magenta dye (M-1) to the magenta dye (M-2) in the water-based magenta ink is preferably in a range of 70:30 to 90:10 (magenta dye (M-1): magenta dye (M-2)). By setting the weight ratio to be in the aforementioned range, it is possible to obtain a water-based magenta ink which is quite satisfactory in both of the color vividness and the light resistance and ozone resistance.

The entire blending amount of the magenta dye (M-1) and the magenta dye (M-2) is not particularly limited, and is preferably in a range of 2% by weight to 6% by weight with respect to the entire amount of the water-based magenta ink. By setting the entire blending amount to be in the aforementioned range, it is possible to obtain a water-based magenta ink which is quite satisfactory in all of the storing stability, the color vividness or brightness, the light resistance, the ozone resistance, and the jetting stability.

The water-based magenta ink may further contain, in addition to the magenta dye, another magenta colorant which is exemplified by a pigment, etc. Alternatively, it is allowable that the water-based magenta ink does not contain the another magenta colorant, in addition to the magenta dye.

The water-based magenta ink may further contain water and water-soluble organic solvent. The water and the blending amount of the water are similar to the water and the blending amount of the water in the water-based yellow ink. The water-soluble organic solvent and the blending amount of the water-soluble organic solvent are also similar to the water-soluble organic solvent and the blending amount of the water-soluble organic solvent in the water-based yellow ink.

The water-based magenta ink may further contain a conventionally known additive as required. The additive is also similar to the additive in the water-based yellow ink.

The water-based magenta ink can be prepared, for example, by uniformly mixing the above-described magenta dye with other addition components as required by a conventionally known method, and then removing any non-dissolved matter, etc. with a filter etc.

[Water-Based Cyan Ink]

As described above, the water-based cyan ink contains the cyan dye and the hue angle $\angle H°$ of the water-based cyan ink is in a range of 220° to 240°. There is no particular limitation to the composition of the water-based cyan ink, provided that the water-based cyan ink contains the cyan dye and the hue angle $\angle H°$ of the water-based cyan ink is in a range of 220° to 240°.

The cyan dye preferably includes the following cyan dye (C-1):

Cyan dye (C-1): a dye represented by the following formula (C-1).

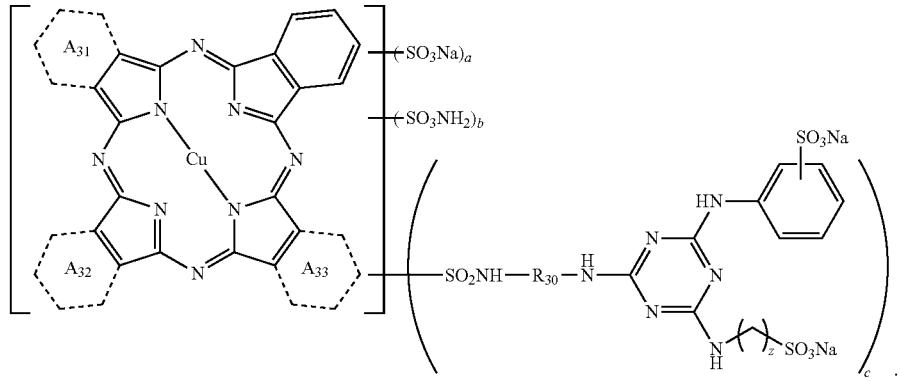

(C-1)

In the formula (C-1):

each of rings $A_{31}$, $A_{32}$, and $A_{33}$ is a benzene ring, a 2,3-pyridine ring, or a 3,2-pyridine ring;

at least one of rings $A_{31}$, $A_{32}$, and $A_{33}$ is a 2,3-pyridine ring or a 3,2-pyridine ring, and the rings $A_{31}$, $A_{32}$, and $A_{33}$ may be identical to or different from one another;

a satisfies $0 \leq a \leq 4$;

b satisfies $0 \leq b \leq 4$;

c satisfies 0≤c≤4;
a, b, and c satisfy 0≤a+b+c≤4;
z is an integer satisfying 1≤z≤3; and
$R_{30}$ is a straight chain alkyl group having 1 to 6 carbon atoms.

A compound represented by the formula (C-1) may be a compound in which all of rings $A_{31}$, $A_{32}$, and $A_{33}$ are 2,3-pyridine rings or 3,2-pyridine rings; a compound in which two of the same are 2,3-pyridine rings or 3,2-pyridine rings and the other one is a benzene ring; or a compound in which one of the same is a 2,3-pyridine ring or a 3,2-pyridine ring and the other two are benzene rings. The cyan dye (C-1) may be composed of one of the aforementioned compounds or may be a mixture containing two or more of them.

The dye represented by the formula (C-1) can be produced by, for example, the method disclosed in U.S. Pat. No. 8,603,232 the disclosure of which is incorporated herein by reference in its entirety, as constituting a portion of the present specification.

Preferred specific examples of the cyan dye (C-1) include compounds represented by the following formulae (C-1a) to (C-1f).

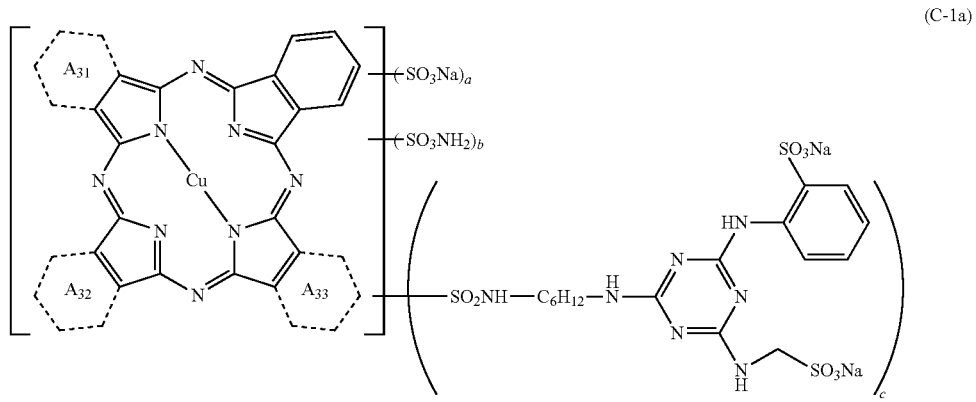

(C-1a)

In the formula (C-1 a):
rings $A_{31}$, $A_{32}$, and $A_{33}$ each independently are a 2,3-pyridine ring or a 3,2-pyridine ring;
a is 1.0; b is 1.8; c is 1.2; and a, b, and c are average values in a mixture.

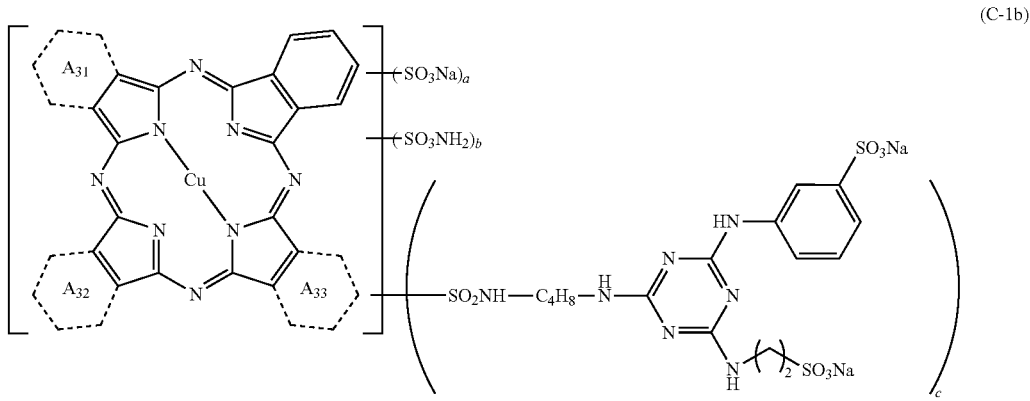

(C-1b)

In the formula (C-1b),
rings $A_{31}$ and $A_{32}$ each independently are a 2,3-pyridine ring or a 3,2-pyridine ring;
a ring $A_{33}$ is a benzene ring; and
a is 2.4, b is 0.6, c is 1.0, and a, b, and c are average values in a mixture.

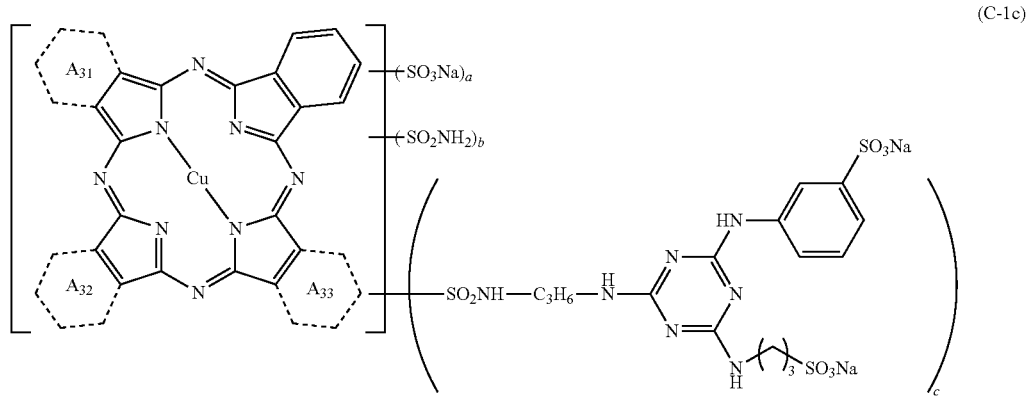
(C-1c)
In the formula (C-1c),
rings $A_{31}$, $A_{32}$, and $A_{33}$ each independently are a 2,3-pyridine ring or a 3,2-pyridine ring; and
a is 3.0, b is 0.2, c is 0.8, and a, b, and c are average values in a mixture.
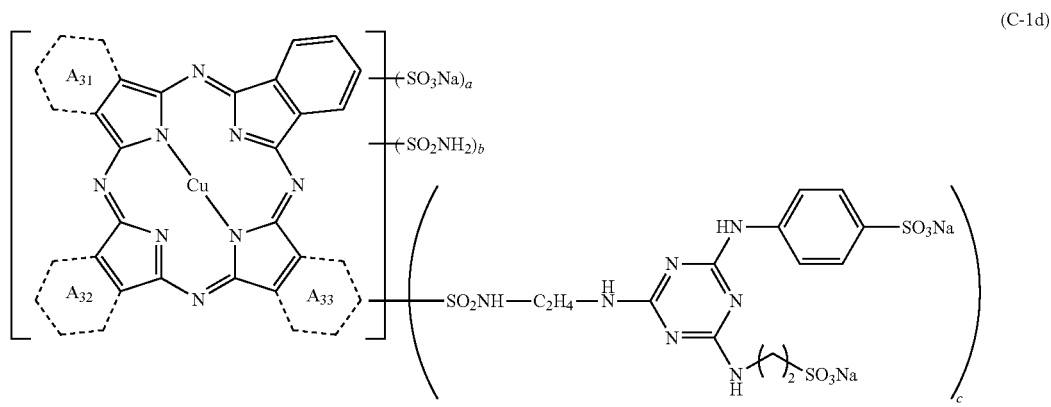
(C-1d)
In the formula (C-1d),
a ring $A_{31}$ is a benzene ring;
rings $A_{32}$ and $A_{33}$ each independently are a 2,3-pyridine ring or a 3,2-pyridine ring; and
a is 1.8, b is 0.9, c is 1.3, and a, b, and c are average values in a mixture.
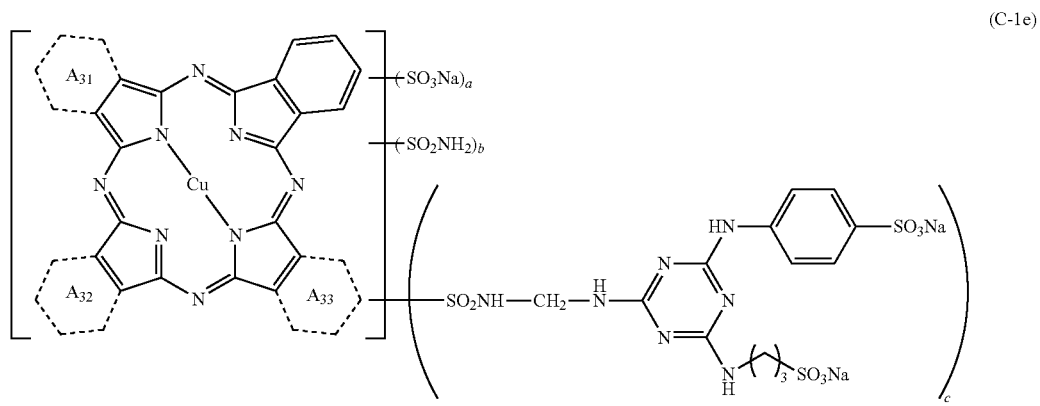
(C-1e)

In the formula (C-1e), rings $A_{31}$, $A_{32}$, and $A_{33}$ each independently are a 2,3-pyridine ring or a 3,2-pyridine ring;

a is 1.1, b is 1.3, c is 1.6, and a, b, and c are average values in a mixture.

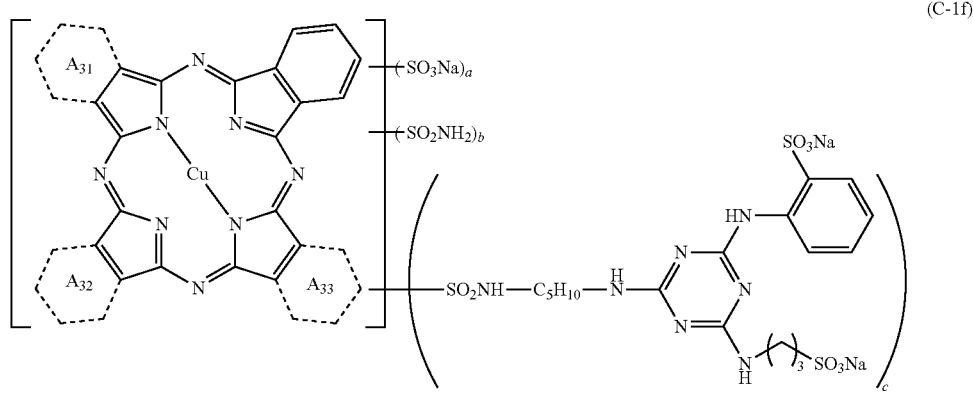

(C-1f)

In the formula (C-1f), rings $A_{31}$ and $A_{33}$ each independently are a 2,3-pyridine ring or a 3,2-pyridine ring;

a ring $A_{32}$ is a benzene ring; and a is 0, b is 1.8, c is 2.2, and a, b, and c are average values in a mixture.

The cyan dye preferably contains, in addition to the cyan dye (C-1), a cyan dye (C-2) as indicated below:

Cyan dye (C-2): at least one dye selected from the group consisting of a dye represented by the formula (C-2a), a dye represented by the formula (C-2b), C. I. Direct Blue 199, and C. I. Direct Blue 86.

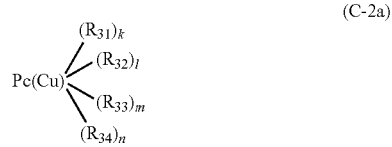

(C-2a)

In the formula (C-2a),

Pc (Cu) is a copper phthalocyanine nucleus represented by the formula (Pc);

$R_{31}$, $R_{32}$, $R_{33}$, and $R_{34}$ each are a substituent selected from the group consisting of a $-SO_2R_a$, a $-SO_2NR_bR_c$, and a $-CO_2R_a$;

$R_{31}$, $R_{32}$, $R_{33}$, and $R_{34}$ are not all identical to each other;

at least one of $R_{31}$, $R_{32}$, $R_{33}$, and $R_{34}$ has an ionic hydrophilic group as a substituent;

at least one of $R_{31}$, $R_{32}$, $R_{33}$, and $R_{34}$ is present on each of four benzene rings A, B, C, and D of the copper phthalocyanine nucleus represented by the formula (Pc);

$R_a$ is a substituted or unsubstituted alkyl group;

$R_b$ is a hydrogen atom or a substituted or unsubstituted alkyl group;

$R_c$ is a substituted or unsubstituted alkyl group;

K satisfies $0<k<8$;
l satisfies $0<l<8$;
m satisfies $0\leq m<8$;
n satisfies $0\leq n<8$; and
k, l, m, and n satisfy $4\leq k+l+m+n\leq 8$.

$$Pc(Cu) \begin{matrix} (SO_3M_0)_x \\ (SO_2NH_2)_y \end{matrix} \quad (C\text{-}2b)$$

In the formula (C-2b),

Pc (Cu) is a copper phthalocyanine nucleus represented by the following formula (Pc);

$M_0$ is any one of lithium, sodium, potassium, and ammonium ($NH_4$);

x satisfies $0<x<4$; y satisfies $0<y<4$; x and y satisfy $2\leq x+y\leq 5$; and a $-SO_3M_0$ group and a $-SO_2NH_2$ group are present on any of four benzene rings A, B, C, and D of the copper phthalocyanine nucleus represented by the formula (Pc).

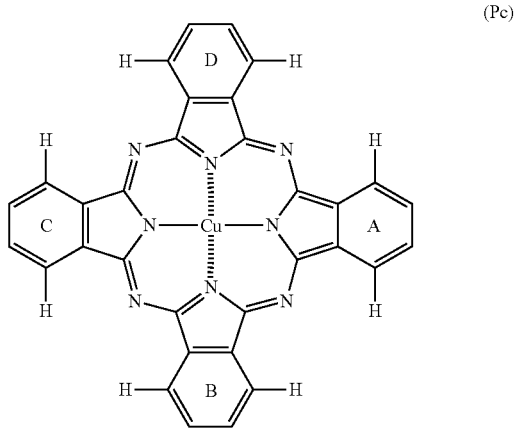

(Pc)

In the formula (C-2a), the substituted or unsubstituted alkyl group is preferably a straight chain, branched chain or alicyclic alkyl group having 1 to 12 carbon atoms. The alkyl group is preferably the one having a branched chain, and especially preferably the one having an asymmetric carbon atom (in the form of a racemic body) from the view point of improving the solubility of the dye and the stability of the water-based cyan ink. The substituted or unsubstituted alkyl group includes a methyl group, an ethyl group, a n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, and the like.

In the formula (C-2a), a substituent of the substituted alkyl group includes a straight chain or branched chain alkyl group having 1 to 12 carbon atoms, such as a methyl group, an ethyl group, a propyl group, an isopropyl group, a sec-butyl group, a tert-butyl group, a 2-ethylhexyl group, a 2-methylsulfonyl ethyl group, a 3-phenoxy propyl group, a trifluoromethyl group, a cyclopentyl group, or the like; a straight chain or branched chain aralkyl group having 7 to 18 carbon atoms; a straight chain or branched chain alkenyl group having 2 to 12 carbon atoms; a straight chain or branched chain alkynyl group having 2 to 12 carbon atoms; a straight chain or branched chain cycloalkyl group having 3 to 12 carbon atoms; a straight chain or branched chain cycloalkenyl group having 3 to 12 carbon atoms; a halogen atom such as a chlorine atom, a bromine atom, or the like; an aryl group such as a phenyl group, a 4-tert-butylphenyl group, a 2,4-di-tert-aminophenyl group, or the like; a heterocyclic group such as an imidazolyl group, a pyrazolyl group, a triazolyl group, a 2-furil group, a 2-thienyl group, a 2-pyrimidinyl group, a 2-benzothiazolyl group, or the like; a cyano group; a hydroxyl group; a nitro group; a carboxyl group; an amino group; an alkoxy group such as a methoxy group, an ethoxy group, a 2-methoxyethoxy group, a 2-methanesulfonylethoxy group, or the like; an aryloxy group such as a phenoxy group, a 2-methylphenoxy group, a 4-tert-butylphenoxy group, a 3-nitrophenoxy group, a 3-tert-butoxycarbamoylphenoxy group, a 3-methoxycarbamoyl group, or the like; an acylamino group such as an acetamide group, a benzamide group, a 4-(3-tert-butyl-4-hydroxyphenoxy) butanamide group, or the like; an alkylamino group such as a methylamino group, a butylamino group, a diethylamino group, a methylbutylamino group, or the like; an anilino group such as a phenylamino group, a 2-chloroanilino group, or the like; an ureide group such as a phenylureide group, a methylureide group, an N,N-dibutylureide group, or the like; a sulfamoylamino group such as an N,N-dipropylsulfamoylamino group or the like; an alkylthio group such as a methylthio group, an octylthio group, a 2-phenoxyethylthio group, or the like; an arylthio group such as a phenylthio group, a 2-butoxy-5-tert-octylphenylthio group, a 2-carboxyphenylthio group, or the like; an alkoxycarbonylamino group such as a methoxycarbonylamino group or the like; a sulfonamide group such as a methanesulfonamide group, a benzenesulfonamide group, a p-toluenesulfonamide group, or the like; an N-ethylcarbamoyl group; a sulfamoyl group such as an N,N-dipropylsulfamoyl group, an N-phenylsulfamoyl group or the like; a sulfonyl group such as a methanesulfonyl group, an octanesulfonyl group, a benzenesulfonyl group, a toluenesulfonyl group, or the like; an alkoxycarbonyl group such as a methoxycarbonyl group, a butoxycarbonyl group, or the like; a heterocyclic oxy group such as a 1-phenyltetrazole-5-oxy group, a 2-tetrahydropyranyloxy group, or the like; an azo group such as a phenylazo group, a 4-methoxyphenylazo group, a 4-pivaloylaminophenylazo group, a 2-hydroxy-4-propanoylphenylazo group, or the like; an acyloxy group such as an acetoxy group or the like; a carbamoyloxy group such as an N-methylcarbamoyloxy group, an N-phenylcarbamoyloxy group, or the like; a silyloxy group such as a trimethylsilyloxy group, a dibutylmethylsilyloxy group, or the like; an aryloxycarbonylamino group such as a phenoxycarbonylamino group or the like; an imide group such as an N-succinimide group, an N-phthalimide group, or the like; a heterocyclic thio group such as a 2-benzothiazolylthio group, a 2,4-diphenoxy-1,3,5-triazole-6-thio group, a 2-pyridylthio group, or the like; a sulfinyl group such as a 3-phenoxypropylsulfinyl group or the like; a phosphonyl group such as a phenoxyphosphonyl group, an octyloxyphosphonyl group, a phenylphosphonyl group, or the like; an aryloxycarbonyl group such as a phenoxycarbonyl group or the like; an acyl group such as an acetyl group, a 3-phenylpropanoyl group, a benzoyl group, or the like; an ionic hydrophilic group such as a carboxyl group, a sulfo group, a phosphono group, a quaternary ammonium group, or the like; and the like. The alkyl group, the aralkyl group, the alkenyl group, the alkynyl group, the cycloalkyl group, and the cycloalkenyl group as the substituent of the substituted alkyl group are preferably those having a branched chain, especially preferably those having an asymmetric carbon atom, from the view point of improving the solubility of the dye and the stability of the water-based cyan ink.

A preferred cyan dye (C-2a) is, for example, an aspect wherein in the formula (C-2a), $R_{31}$, $R_{32}$, $R_{33}$, and $R_{34}$ each represent a —$SO_2R_a$; the respective $R_a$s in $R_{31}$, $R_{32}$, $R_{33}$, and $R_{34}$ are not all identical; and at least one of the $R_a$s is a substituted alkyl group having an ionic hydrophilic group.

A more preferred cyan dye (C-2a) is, for example, an aspect wherein in the formula (C-2a), k satisfies 0<k<4, l satisfies 0<l<4, m satisfies 0≤m<4, n satisfies 0≤n<4, and k, l, m, and n satisfy k+l+m+n=4.

The dye represented by the formula (C-2a) can be produced by, for example, the method disclosed in U.S. Pat. No. 8,603,232 the disclosure of which is incorporated herein by reference in its entirety, as constituting a portion of the present specification.

Preferred specific examples of the cyan dye (C-2a) include compounds represented by the formulae (C-2a-1) to (C-2a-5).

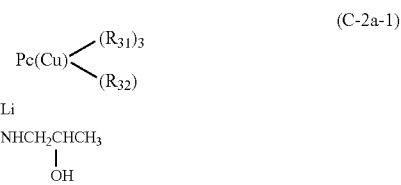

(C-2a-1)

$R_{31}$ = —$SO_2(CH_2)_3SO_3Li$ $R_{32}$ = —$SO_2(CH_2)_3SO_2NHCH_2CHCH_3$
                                          |
                                          OH

The compound represented by the formula (C-2a-1) is a compound wherein in the formula (C-2a), $R_{31}$ is a lithium sulfonato propylsulfonyl group, $R_{32}$ is an N-(2-hydroxypropyl) sulfamoylpropylsulfonyl group, k is 3, l is 1, and m and n are both 0.

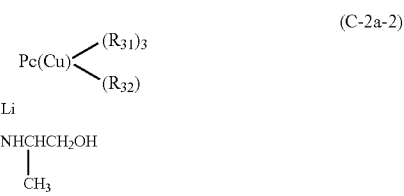

(C-2a-2)

$R_{31}$ = —$SO_2(CH_2)_3SO_3Li$ $R_{32}$ = —$SO_2(CH_2)_3SO_2NHCHCH_2OH$
                                       |
                                       $CH_3$

The compound represented by the formula (C-2a-2) is an aspect wherein in the formula (C-2a), $R_{31}$ is a lithium sulfonato propylsulfonyl group, $R_{32}$ is an N-(2-hydroxyisopropyl) sulfamoylpropylsulfonyl group, k is 3, l is 1, and m and n are both 0.

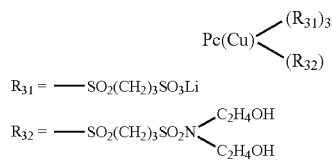

(C-2a-3)

$R_{31} = $ —$SO_2(CH_2)_3SO_3Li$ $R_{32} = $ —$SO_2(CH_2)_3SO_2N\begin{smallmatrix}C_2H_4OH\\C_2H_4OH\end{smallmatrix}$ The compound represented by the formula (C-2a-3) is an aspect wherein in the formula (C-2a), $R_{31}$ is a lithium sulfonato propylsulfonyl group, $R_{32}$ is an N,N-(di(2-hydroxyethyl)) sulfamoylpropylsulfonyl group, k is 3, l is 1, and m and n are both 0.

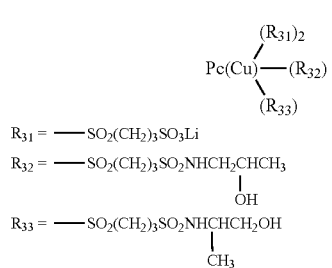

(C-2a-4)

$R_{31} = $ —$SO_2(CH_2)_3SO_3Li$ $R_{32} = $ —$SO_2(CH_2)_3SO_2NHCH_2CHCH_3$
　　　　　　　　　　　　　　　　|
　　　　　　　　　　　　　　　　OH $R_{33} = $ —$SO_2(CH_2)_3SO_2NHCHCH_2OH$
　　　　　　　　　　　　　　|
　　　　　　　　　　　　　　$CH_3$

The compound represented by the formula (C-2a-4) is an aspect wherein in the formula (C-2a), $R_{31}$ is a lithium sulfonato propylsulfonyl group, $R_{32}$ is an N-(2-hydroxypropyl) sulfamoylpropylsulfonyl group, $R_{33}$ is an N-(2-hydroxyisopropyl) sulfamoylpropylsulfonyl group, k is 2, l is 1, m is 1, and n is 0.

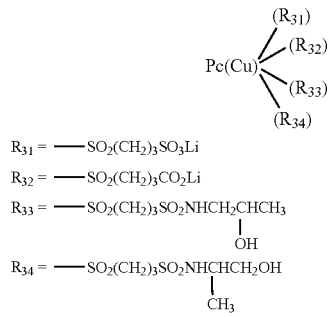

(C-2a-5)

$R_{31} = $ —$SO_2(CH_2)_3SO_3Li$ $R_{32} = $ —$SO_2(CH_2)_3CO_2Li$ $R_{33} = $ —$SO_2(CH_2)_3SO_2NHCH_2CHCH_3$
　　　　　　　　　　　　　　　　|
　　　　　　　　　　　　　　　　OH $R_{34} = $ —$SO_2(CH_2)_3SO_2NHCHCH_2OH$
　　　　　　　　　　　　　　|
　　　　　　　　　　　　　　$CH_3$

The compound represented by the formula (C-2a-5) is an aspect wherein in the formula (C-2a), $R_{31}$ is a lithium sulfonato propylsulfonyl group, $R_{32}$ is a lithium carboxylate propylsulfonyl group, $R_{33}$ is an N-(2-hydroxypropyl) sulfamoylpropylsulfonyl group, $R_{34}$ is an N-(2-hydroxyisopropyl) sulfamoylpropylsulfonyl group, and k, l, m, and n are all 1.

In the formula (C-2b), the $M_O$ may be ionized in a water-based cyan ink to become an ion (any of $Li^+$, $Na^+$, $K^+$, and $NH_4^+$). With respect to the water-based cyan ink, in the formula (C-2b), x and y may satisfy x+y=4.

The dye represented by the formula (C-2b) can be produced by, for example, the method disclosed in U.S. Pat. No. 8,603,232 the disclosure of which is incorporated herein by reference in its entirety, as constituting a portion of the present specification.

Preferred specific examples of the cyan dye (C-2b) include compounds represented by the following formulae (C-2b-1) to (C-2b-4).

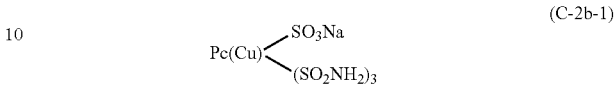

(C-2b-1)

The compound represented by the formula (C-2b-1) is an aspect wherein in the formula (C-2b), $M_0$ is sodium, x is 1, y is 3, and a substituent is present on each of the four benzene rings A, B, C, and D of the copper phthalocyanine nucleus represented by the formula (Pc).

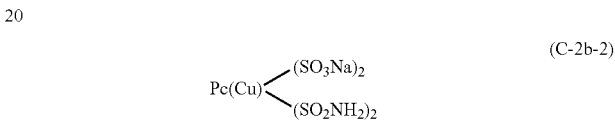

(C-2b-2)

The compound represented by the formula (C-2b-2) is an aspect wherein in the formula (C-2b), $M_o$ is sodium, x is 2, y is 2, and a substituent is present on each of the four benzene rings A, B, C, and D of the copper phthalocyanine nucleus represented by the formula (Pc).

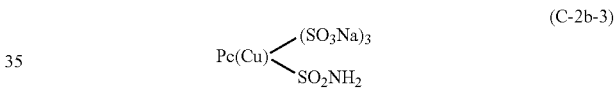

(C-2b-3)

The compound represented by the formula (C-2b-3) is an aspect wherein in the formula (C-2b), $M_0$ is sodium, x is 3, y is 1, and a substituent is present on each of the four benzene rings A, B, C, and D of the copper phthalocyanine nucleus represented by the formula (Pc).

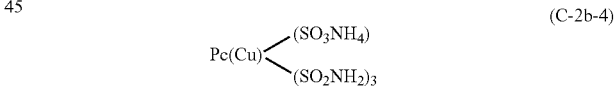

(C-2b-4)

The compound represented by the formula (C-2b-4) is an aspect wherein in the formula (C-2b), $M_0$ is ammonium, x is 1, y is 3, and a substituent is present on each of the four benzene rings A, B, C, and D of the copper phthalocyanine nucleus represented by the formula (Pc).

C. I. Direct Blue 86 is, for example, a dye represented by the following formula (C-2d).

(C-2d)

In a case that the cyan dye (C-2) is used in addition to the cyan dye (C-1), the blending amount of the cyan dye (C-1) is not particularly limited. It is possible to improve the storing stability, light resistance, ozone resistance and jetting stability by blending the cyan dye (C-1) to the water-based cyan ink. The blending amount of the cyan dye (C-1) is, for example, in a range of 0.1% by weight to 10% by weight, preferably in a range of 1.4% by weight to 5.7% by weight, more preferably in a range of 1.6% by weight to 4.8% by weight, with respect to the entire amount of the water-based cyan ink.

In a case that the cyan dye (C-2) is used in addition to the cyan dye (C-1), the blending amount of the cyan dye (C-2) is not particularly limited. It is possible to improve the color vividness by blending the cyan dye (C-2) to the water-based cyan ink. The blending amount of the cyan dye (C-2) is, for example, in a range of 0.05% by weight to 5% by weight, preferably in a range of 0.1% by weight to 1.8% by weight, more preferably in a range of 0.1% by weight to 1.5% by weight, with respect to the entire amount of the water-based cyan ink.

In a case that the cyan dye (C-2) is used in addition to the cyan dye (C-1), the weight ratio of the cyan dye (C-1) to the cyan dye (C-2) in the water-based cyan ink is preferably in a range of 70:30 to 95:5 (cyan dye (C-1): cyan dye (C-2)). By setting the weight ratio to be in the aforementioned range, it is possible to obtain a water-based cyan ink which is quite satisfactory in the jetting stability in addition to being quite satisfactory in the storing stability, color vividness, light resistance and ozone resistance.

The entire blending amount of the cyan dye (C-1) and the cyan dye (C-2) is not particularly limited, and is preferably in a range of 2% by weight to 7% by weight with respect to the entire amount of the water-based cyan ink. By setting the entire blending amount to be in the aforementioned range, it is possible to obtain a water-based cyan ink which is quite satisfactory in all of the storing stability, color vividness or brightness, light resistance, ozone resistance, and jetting stability.

The water-based cyan ink may further contain, in addition to the cyan dye, another cyan colorant which is exemplified by a pigment, etc. Alternatively, it is allowable that the water-based cyan ink does not contain the another cyan colorant, in addition to the cyan dye.

The water-based cyan ink may further contain water and water-soluble organic solvent. The water and the blending amount of the water are similar to the water and the blending amount of the water in the water-based yellow ink. The water-soluble organic solvent and the blending amount of the water-soluble organic solvent are also similar to the water-soluble organic solvent and the blending amount of the water-soluble organic solvent in the water-based yellow ink.

The water-based cyan ink may further contain a conventionally known additive as required. The additive is also similar to the additive in the water-based yellow ink.

The water-based cyan ink can be prepared, for example, by uniformly mixing the above-described cyan dye with other addition components as required by a conventionally known method, and then removing any non-dissolved matter, etc. with a filter etc.

Each of the water-based yellow ink, water-based magenta ink and water-based cyan ink as described above have the hue angle $\angle H°$ in the predetermined range on the recording medium. Although the hue angle $\angle H°$ of a water-based ink varies or changes to some extent depending on the balance of the composition of the water-based ink as a whole, the hue angle $\angle H°$ is determined mainly by the kind of the colorant contained in the ink. Therefore, it is possible to prepare a water-based ink having a hue angle $\angle H°$ in the predetermined range by selecting the kind of the colorant. Further, a blending amount (y) of the yellow dye in the water-based yellow ink, a blending amount (m) of the magenta dye in the water-based magenta ink and a blending amount (c) of the cyan dye in the water-based cyan ink preferably have the following relationship among themselves:

$$y \le m \le c$$

wherein y: the blending amount of the yellow dye in the water-based yellow ink;

m: the blending amount of the magenta dye in the water-based magenta ink;

c: the blending amount of the cyan dye in the water-based cyan ink.

By using the water-based inks having the foregoing relationship, the color balance of the composite black can be easily maintained in an appropriate range.

The ink-jet recording apparatus and the ink-jet recording method according to the present teaching are each applicable to full-color recording by using the water-based ink of three colors as described above. The ink-jet recording apparatus and the ink-jet recording method according to the present teaching may be configured to use only the water-based inks of the three colors, or may further include a water-based ink of a color other than the three colors. The water-based ink of a color other than the three colors includes a water-based black ink, a water-based red ink, a water-based green ink, a water-based blue ink, water-based light inks with low concentrations of colorant (a water-based light yellow ink, a water-based light magenta ink, a water-based light cyan ink, a water-based light black ink, a water-based light red ink, a water-based light green ink, a water-based light blue ink, and the like), and the like. In the ink jet recording apparatus and the ink-jet recording method according to the present teaching, the water-based black ink is preferably used to be more suitably applicable to the full-color recording.

The ink-jet recording apparatus of the present teaching is an ink-jet recording apparatus including an ink-accommodating section, an ink discharging mechanism (ink-jet head) and a controlling mechanism (controller). The ink accommodating section is capable of accommodating the water-based yellow ink, water-based magenta ink and water-based cyan ink. In the ink-jet recording apparatus of the present teaching, the configuration other than the controller may be same as that in a conventional ink jet recording apparatus.

Figure 2:
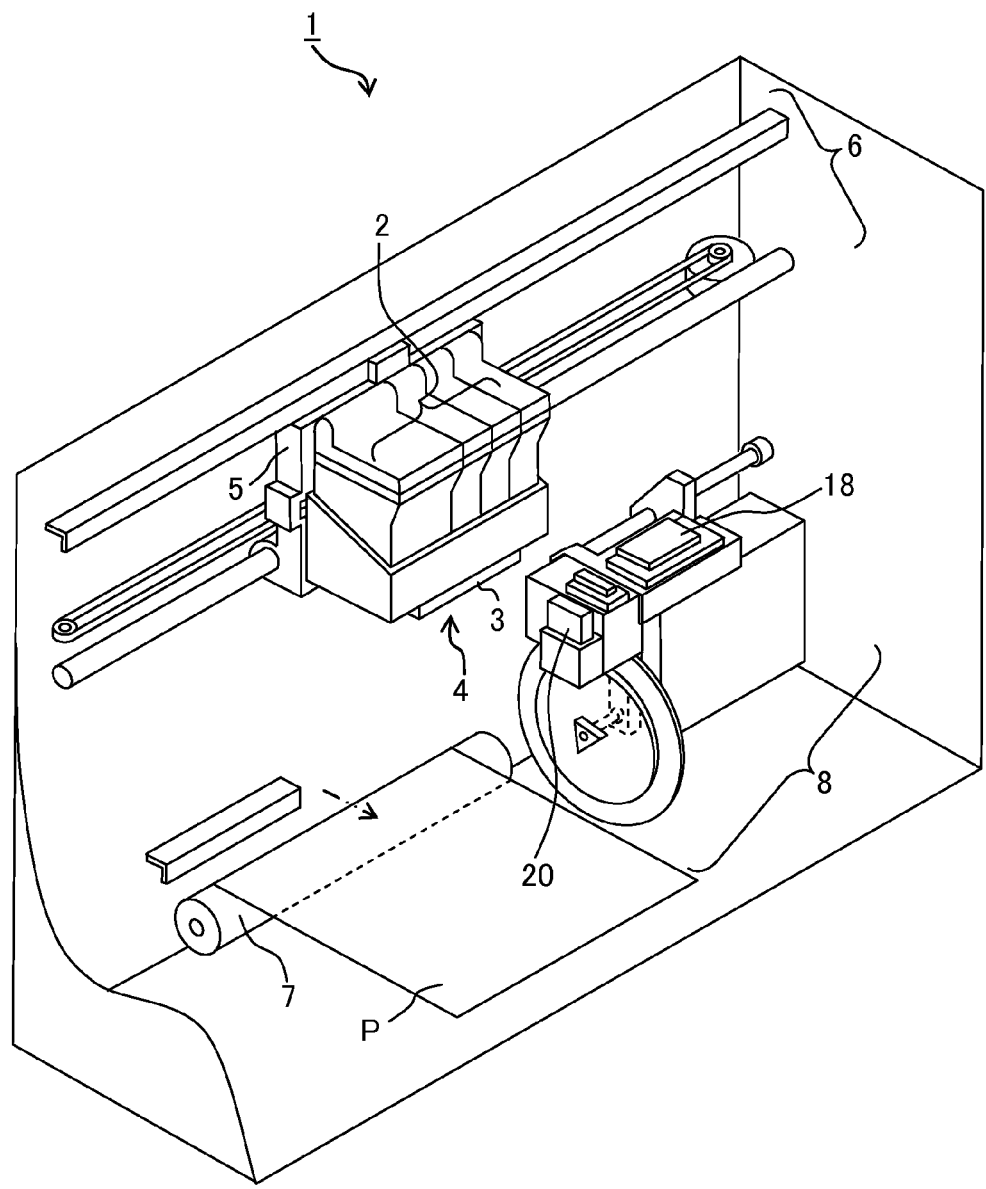
FIG. 2 is a schematic perspective view showing an exemplary configuration of the ink-jet recording apparatus of the present teaching.

FIG. 2 shows an example of the construction of the ink-jet recording apparatus of the present teaching (except for the controlling mechanism), as an ink-jet recording apparatus 1. As shown in FIG. 2, the ink jet recording apparatus 1 includes four ink cartridges 2, an ink discharging mechanism (ink-jet head) 3, a head unit 4, a carriage 5, a drive unit 6, a platen roller 7, and a purge unit 8 as main components.

The four ink cartridges 2 contain water-based inks of four colors, namely, yellow, magenta, cyan and black, respectively. The ink-jet head 3, which is provided on the head unit 4, performs recording on a recording medium (for example, a recording paper sheet) P.

The four ink cartridges 2 and the head unit 4 are provided on the carriage 5. The driving unit 6 reciprocates the carriage 5 in a linear direction. As the driving unit 6, it is possible to use, for example, a conventionally known driving unit (see, for example, United States Patent Application Publication No. US 2008/0241398 corresponding to Japanese Patent Application Laid-open No. 2008-246821). The platen roller 7 extends in the reciprocating direction of the carriage 5 and is arranged to face or be opposite to the ink-jet head 3.

The purge device 8 sucks unsatisfactory or degraded ink containing air bubbles etc. accumulated in the ink-jet head 3. As the purge device 8, it is possible to use, for example, a conventionally known purge device (for example, see United States Patent Application Publication No. US 2008/0241398 corresponding to Japanese Patent Application Laid-open No. 2008-246821).

A wiper member 20 is provided on the purge device 8, at a position on the side of the platen roller 7 such that the wiper member 20 is adjacent to the purge device 8. The wiper member 20 is formed to have a spatula form, and wipes a nozzle-formation surface of the ink-jet head 3 accompanying with the movement of the carriage 5. In FIG. 2, a cap 18 is provided to cover a plurality of nozzles of the ink-jet head 3 which is returned to the reset position upon completion of the recording, so as to prevent the water-based inks from drying.

In the ink-jet recording apparatus 1 of the present teaching, the four ink cartridges 2 are provided on one carriage 5, together with the head unit 4. The present teaching, however, is not limited to this. In the ink jetrecording apparatus, each of the four ink cartridges 2 may be provided on another carriage that is different from the carriage on which the head unit 4 is provided. Alternatively, the respective four ink cartridges 2 may be arranged and fixed inside the ink jetrecording apparatus, rather than being provided on the carriage 5. In such an aspect, for example, each of the four ink cartridges 2 and the head unit 4 which is provided on the carriage 5 are connected with a tube, etc., and each of the water-based inks are supplied from the four ink cartridges 2 to the head unit 4 via the tube.

The ink-jet recording using the ink-jet recording apparatus 1 is performed, for example, in the following manner. At first, the recording paper sheet P is supplied or fed from a paper feeding cassette (not shown) arranged at a side of or at a position below the ink-jet recording apparatus 1. The recording paper sheet P is introduced between the ink-jet head 3 and the platen roller 7. Then, a predetermined recording is performed on the introduced recording paper sheet P with the water-based ink(s) discharged from the ink-jet head 3. After the recording, the recording paper sheet P is discharged from the ink-jet recording apparatus 1. In FIG. 2, the paper feeding mechanism and discharging mechanism for the recording paper sheet P are omitted.

The ink-jet recording apparatus of the present teaching may be an ink-jet head of serial type (serial type ink-jet head) as shown in FIG. 2, or may be an ink-jet recording apparatus of line type.

Next, in the ink-jet recording apparatus and ink-jet recording method of the present teaching, composite black is formed on a recording medium by using the water-based yellow ink, water-based magenta ink and water-based cyan ink so as to satisfy the following conditions (A) and (B):

$$0.66 \leq C/(Y+M) \quad (A)$$

$$530 \leq Y+M+C \leq 600, \quad (B)$$

wherein in the conditions (A) and (B),

Y: drop amount (ng) of the yellow dye dropped in a 25.4 mm×25.4 mm area of the recording medium;

M: drop amount (ng) of the magenta dye dropped in the 25.4 mm×25.4 mm area of the recording medium; and C: drop amount (ng) of the cyan dye dropped in the 25.4 mm×25.4 mm area of the recording medium.

Although any specific reason is unknown, the contribution of the cyan dye to the optical density (OD value) of the composite black is great; it is possible to improve the optical density (OD value) of the composite black by increasing the ratio of the cyan dye in the composite black so as to satisfy the condition (A). However, in a case that the total amount of the dyes of the three primal colors is less than a predetermined amount, the optical density (OD value) of the composite black is lowered. On the other hand, in a case that the total amount is more than the predetermined amount, the fixability is worsened. Therefore, it is important to satisfy the condition (B) as well as satisfying the condition (A) so as to form composite black with high optical density (OD value). Note that the term "composite black" means a black which is formed by mixing the water-based yellow ink, the water-based magenta ink and the water-based cyan ink. Accordingly, in the conditions (A) and (B), each of "Y", "M" and "C" is a value greater than "0" (zero).

Next, an explanation will be given about formation of the composite black in the ink jetrecording apparatus and the ink-jet recording method of the present teaching, by way of an example.

Figure 1B:
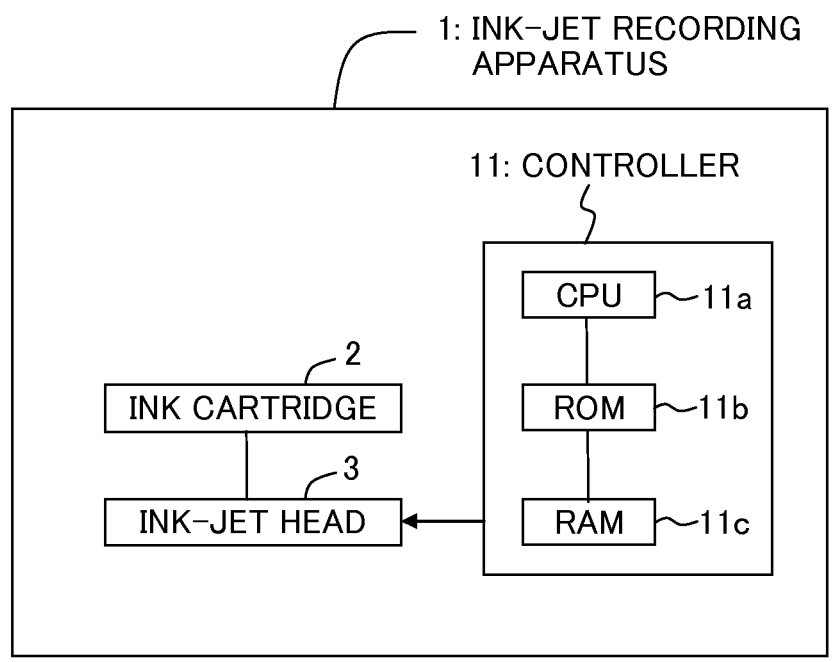
FIG. 1B is a block diagram showing the relationship among an ink cartridge (ink accommodating section), an ink-jet head (ink discharging mechanism) and a controlling mechanism (controller) of an ink-jet recording apparatus of the present teaching.

FIG. 1A is a flow chart showing an example of formation of the composite black in the present teaching, and FIG. 1B is a block diagram showing the relationship among the ink cartridge(s) (ink accommodating section) 2, the ink-jet head (ink discharging mechanism) 3 and a controlling mechanism (controller) 11 of the ink-jet recording apparatus 1 of the present teaching. In this example, the controlling mechanism 11 is constructed of a CPU (Central Processing Unit) 11a, ROM (Read Only Memory) 11b and RAM (Random Access Memory) 11c. The controlling mechanism 11, however, is not limited to that shown in this example. The ink-jet head 3 has nozzle arrays each of which is formed of a plurality of nozzles for one of the four colors of water-based inks; and the nozzle array for water-based black ink, the nozzle array for water-based yellow ink, the nozzle array for water-based cyan ink and the nozzle array for water-based magenta ink are aligned in this order in the scanning direction. The alignment order is merely an example, and the nozzle arrays may be aligned in a different order from the above order in this example. For example, it is allowable that the nozzle arrays are arranged in the scanning direction in an order of the nozzle array for the water-based black ink, the nozzle array for the water-based magenta ink, the nozzle array for the water-based cyan ink, and the nozzle array for the water-based yellow ink.

The formation of the composite black in the ink-jet recording apparatus and the ink jetrecording method in this example is performed, for example, in the following manner. Note that in this example, a solid printing of the composite black is to be performed.

At first, as shown in FIGS. 1A and 1B, when the recording operation is started, the carriage on which the ink cartridges 2 are provided starts to move in the scanning direction, and the controlling mechanism 11 judges whether or not the carriage has reached at a composite black-formation position at which the composite black is to be formed (S1). In a case that the controlling mechanism 11 judges that the carriage has not reached to the composite black-formation position (S1: No), formation of color portion other than the composite black is performed. The formation of the color portion may include formation of a black portion using a single-color water based black ink. In a case that the controlling mechanism 11 judges that the carriage has reached to the composite black-formation position (S1: Yes), liquid droplets of the water-based yellow ink, liquid droplets of the water-based cyan ink and liquid droplets of the water-based magenta ink are discharged in this order from the ink-jet head 3. The printing duty corresponds to a value which is set to satisfy the conditions (A) and (B). The "duty" is defined in the following manner. The order of execution and the number of times of execution of the formation of color portion and the formation of composite black are not limited, and can be appropriately changed depending on a desired image to be printed. By using the water-based yellow ink, the water-based magenta ink and the water-based cyan ink each having the hue angle ∠H° defined in the predetermined range, and by performing control so as to satisfy the conditions (A) and (B) of the yellow dye, the magenta dye and the cyan dye each of which is dropped in the predetermined area of the recording medium, the optical density (OD value) of the composite black can be improved and the excellent fixability can be realized.

$$duty(\%)=actual\ recorded\ dot\ number/(vertical\ resolution \times horizontal\ resolution) \times 100$$

actual recorded dot number: actual recorded dot number per unit area
vertical resolution: vertical resolution per unit area
horizontal resolution: horizontal resolution per unit area In the formation of the composite black, the order in which the water-based yellow ink, water-based cyan ink and the water-based magenta ink are discharged is not particularly limited. It is preferable, however, that the liquid droplets are discharged from the ink-jet head 3 in the order of the water-based yellow ink, the water-based cyan ink and the water-based magenta ink, as described above.

In the ink-jet recording apparatus and ink-jet recording method of the present teaching, it is desired that the controlling mechanism 11 controls the ink-jet head 3 to satisfy the following condition (A2) so as to form the composite black on the recording medium. By satisfying the condition (A2) as indicated below, the optical density (OD value) of the composite black can be further improved.

$$0.68 \leq C/(Y+M) \quad (A2)$$

Y: drop amount (ng) of the yellow dye dropped in a 25.4 mm×25.4 mm area of the recording medium;
M: drop amount (ng) of the magenta dye dropped in the 25.4 mm×25.4 mm area of the recording medium; and
C: drop amount (ng) of the cyan dye dropped in the 25.4 mm×25.4 mm area of the recording medium.

Further, it is preferable that the controlling mechanism 11 controls the ink-jet head 3 so as to satisfy the following condition (A3) to thereby form a composite black on a recording medium. By satisfying the condition (A3) as indicated below, it is possible to maintain the color balance of the composite black in an appropriate range.

$$C/(Y+M) \leq 0.74 \quad (A3)$$

Furthermore, it is preferable that the controlling mechanism 11 controls the ink jet head 3 so as to satisfy the following condition (C) to thereby form a composite black on a recording medium.

$$Y<M<C \quad (C)$$

By satisfying the condition (C) as indicated above, namely, by making the amount of the drop amount of the yellow dye, which least contributes to the optical density (OD value) of the composite black, be small and by making the drop amount of the cyan dye, which most contributes to the optical density (OD value) of the composite black, to be great, the optical density (OD value) of the composite black can be further improved.

In the ink-jet recording apparatus and ink-jet recording method of the present teaching, the recording medium on which the composite black is formed is preferably a glossy paper sheet (glossy paper), is more preferably a glossy paper sheet having a coat layer of a void type resin, is further more preferably a glossy paper sheet (microporous type) having a silica layer which includes silica particles having voids therebetween or silica particles having voids in the interior thereof. By using such a glossy paper sheet, the optical density (OD value) of the composite black can be improved and the further excellent fixability can be realized.

In the ink-jet recording apparatus and the ink-jet recording method of the present teaching, in a case that the ink-jet recording apparatus has a plurality of printing mode including a glossy paper sheet printing mode using a glossy paper sheet and a plain paper sheet printing mode using a plain paper sheet and that the glossy paper sheet printing mode is selected among the plurality of printing modes, the controlling mechanism (controller) 11 may control the ink-jet head so as to satisfy the conditions (A) and (B) to thereby form a composite black on a glossy paper sheet as the recording medium. For example, in such a case that the ink-jet recording apparatus of the present teaching is capable of executing a plurality of printing modes including the glossy paper sheet printing mode and plain paper sheet printing mode, and that the user selects the glossy paper sheet printing mode via operation of a button, etc., an instruction for the glossy paper sheet printing mode is transmitted to the controlling mechanism 11, which in turn causes the controlling mechanism 11 to control the ink-jet head 3 so as to satisfy the conditions (A) and (B) to thereby form a composite black on the glossy paper sheet.

As explained above, according to the present teaching, it is possible to increase the optical density (OD value) of the composite black and to realize an excellent fixability by performing control such that the hue angles of the water-based yellow ink, water-based magenta ink and water-based cyan ink are within the predetermined ranges, respectively, and that the water-based yellow ink, water-based magenta ink and water-based cyan ink dropped in the predetermined area of the recording medium satisfy the conditions (A) and (B).

Next, a recorded matter of the present teaching is characterized by being recorded by the ink-jet recording method of the present teaching. The recorded matter of the present teaching, on which recording is performed by the recording method of the present teaching, is capable of improving the optical density (OD value) of the composite black and realizing excellent fixability.

Next, the composite black of the present teaching is characterized by being recorded on a recording medium with the water-based yellow ink, water-based magenta ink and water-based cyan ink so as to satisfy the conditions (A) and (B). The composite black of the present teaching is capable of having improved optical density (OD value) of the composite black and excellent fixability. In the composite black of the present teaching, the conditions such as the compositions of the water-based yellow, magenta and cyan inks, etc. may be similar to those in the ink jetrecording method of the present teaching as described above.

EXAMPLES

Next, examples of the present teaching will be explained together with comparative examples. Note that the present teaching is not limited to or restricted by the examples and the comparative examples which will be described below.

[Preparation of Water-Based Yellow Ink]

Water-based yellow inks Y1 to Y6 were obtained by mixing components thereof in the ink composition (TABLE 2) uniformly and then filtering the resultant mixtures respectively through a hydrophilic polytetrafluoroethylene (PTFE) type membrane filter (pore diameter: 0.20 µm) manufactured by TOYO ROSHI KAISHA, LTD. Note that in TABLE 2, yellow dyes (Y-1a) to (Y-1e) are compounds represented by the formulae (Y-1a) to (Y-1e), respectively. The hue angle ∠H° of the water-based yellow ink Y1 was 84°, and the hue angle ∠H° of the water-based yellow ink Y5 was 92°. Further, the hue angle ∠H° of each of the water-based yellow inks Y2 to Y4 and Y6 was within a range of 80° to 100°.

[Preparation of Water-Based Magenta Ink]

Water-based magenta inks M1 to M5 were obtained by mixing components thereof in the ink composition (TABLE 3) uniformly and then filtering the resultant mixtures respectively through a hydrophilic polytetrafluoroethylene (PTFE) type membrane filter (pore diameter: 0.20 μm) manufactured by TOYO ROSHI KAISHA, LTD. Note that in TABLE 3, magenta dyes (M-1a) to (M-1d) are compounds represented by the formulae (M-1a) to (M-1d), respectively, and magenta dyes (M-2a-2) to (M-2a-4) are compounds represented by the formulae (M-2a-2) to (M-2a-4), respectively. The hue angle ∠H° of the water-based magenta ink M2 was 352°, and the hue angle ∠H° of the water-based magenta ink M4 was 345°.

Further, the hue angle ∠H° of each of the water-based magenta inks M1, M3 and M5 was within a range of 0° to 5° or 345° to 360°.

[Preparation of Water-Based Cyan Ink]

Water-based cyan inks C1 to C7 were obtained by mixing components thereof in the ink composition (TABLE 4) uniformly and then filtering the resultant mixtures respectively through a hydrophilic polytetrafluoroethylene (PTFE) type membrane filter (pore diameter: 0.20 μm) manufactured by TOYO ROSHI KAISHA, LTD. Note that in TABLE 4, cyan dyes (C-1a) to (C-1d) are compounds represented by the formulae (C-1a) to (C-1d), respectively, and cyan dyes (C-2a-1), (C-2a-2) and (C-2a-5) are compounds represented by the formulae (C-2a-1), (C-2a-2) and (C-2a-5), respectively. The hue angle ∠H° of the water-based cyan ink C5 was 232°, and the hue angle ∠H° of the water-based cyan ink C7 was 227°. Further, the hue angle ∠H° of each of the water-based cyan inks C1 to C4 and C6 was within a range of 220° to 240°.

TABLE 2

| | | | Water-based yellow ink | | | | | |
|---|---|---|---|---|---|---|---|---|
| | | | Y1 | Y2 | Y3 | Y4 | Y5 | Y6 |
| Ink composition (% by weight) | Yellow dye (Y-1) | Yellow dye (Y-1a) | 3.0 | — | — | — | 3.8 | — |
| | | Yellow dye (Y-1b) | — | 2.4 | — | — | — | — |
| | | Yellow dye (Y-1c) | — | — | 3.6 | — | — | — |
| | | Yellow dye (Y-1d) | — | — | — | 2.25 | — | — |
| | | Yellow dye (Y-1e) | — | — | — | — | — | 3.6 |
| | Yellow dye (Y-2) | C.I. Direct Yellow 86 | 1.0 | — | — | — | 0.2 | — |
| | | C.I. Direct Yellow 132 | — | 1.6 | — | 0.75 | — | — |
| | | C.I. Direct Yellow 142 | — | — | 0.4 | — | — | 0.4 |
| | Glycerol (*1) | | 18.0 | 18.0 | 18.0 | 19.0 | 18.0 | 25.0 |
| | Polyethylene glycol 200 | | 10.0 | 10.0 | 10.0 | 10.0 | 10.0 | — |
| | 1,5-Pentanediol | | — | — | — | — | — | 5.0 |
| | Triethylene glycol-n-butyl ether | | 3.0 | 3.0 | 3.0 | 3.0 | 3.0 | — |
| | Olfine (trade name) E1010 (*2) | | 0.2 | 0.2 | 0.2 | 0.2 | 0.2 | 0.2 |
| | Water | | balance | balance | balance | balance | balance | balance |
| Total blending amount of dyes (% by weight) | | | 4.0 | 4.0 | 4.0 | 3.0 | 4.0 | 4.0 |

TABLE 3

| | | | Water-based magenta ink | | | | |
|---|---|---|---|---|---|---|---|
| | | | M1 | M2 | M3 | M4 | M5 |
| Ink composition (% by weight) | Magenta dye (M-1) | Magenta dye (M-1a) | 2.8 | — | — | — | — |
| | | Magenta dye (M-1b) | — | 2.4 | — | 2.8 | — |
| | | Magenta dye (M-1c) | — | — | 2.5 | — | — |
| | | Magenta dye (M-1d) | — | — | — | — | 2.8 |
| | Magenta dye (M-2) | Magenta dye (M-2a-2) | 1.2 | — | — | — | — |
| | | Magenta dye (M-2a-3) | — | — | 2.5 | — | — |
| | | Magenta dye (M-2a-4) | — | 1.6 | — | — | — |
| | | C.I. Acid Red 1 | — | — | — | 1.2 | — |
| | | C.I. Acid Red 254 | — | — | — | — | 1.2 |
| | Glycerol (*1) | | 27.0 | 27.0 | 25.5 | 27.0 | 25.0 |
| | 1,5-pentanediol | | — | — | — | — | 5.0 |
| | Dipropylene glycol-n-propyl ether | | 2.0 | 2.0 | 2.0 | 2.0 | — |
| | Olfine (trade name) E1010 (*2) | | 0.2 | 0.2 | 0.2 | 0.2 | 0.2 |
| | Water | | balance | balance | balance | balance | balance |
| Total blending amount of dyes (% by weight) | | | 4.0 | 4.0 | 5.0 | 4.0 | 4.0 |

TABLE 4

| | | | Water-based cyan ink | | | | | | |
|---|---|---|---|---|---|---|---|---|---|
| | | | C1 | C2 | C3 | C4 | C5 | C6 | C7 |
| Ink Composition (% by weight) | Cyan dye (C-1) | Cyan dye (C-1a) | 4.0 | — | — | — | — | — | — |
| | | Cyan dye (C-1b) | — | 4.5 | — | 4.8 | — | — | — |
| | | Cyan dye (C-1c) | — | — | 3.0 | — | — | 4.5 | — |
| | | Cyan dye (C-1d) | — | — | — | — | 5.0 | — | 4.5 |
| | Cyan dye | Cyan dye (C-2a-1) | 1.0 | — | — | — | — | — | — |

TABLE 4-continued

| | | Water-based cyan ink | | | | | | |
|---|---|---|---|---|---|---|---|---|
| | | C1 | C2 | C3 | C4 | C5 | C6 | C7 |
| (C-2) | Cyan dye (C-2a-2) | — | 0.5 | — | 1.2 | — | — | — |
| | Cyan dye (C-2a-5) | — | — | 2.0 | — | — | — | — |
| | C.I. Direct Blue 199 | — | — | — | — | — | — | 0.5 |
| | C.I. Direct Blue 86 | — | — | — | — | — | 0.5 | — |
| Glycerol (*1) | | 15.0 | 15.0 | 15.0 | 13.5 | 15.0 | 15.0 | 22.0 |
| Polyethylene glycol 200 | | 10.0 | 10.0 | 10.0 | 10.0 | 10.0 | 10.0 | — |
| 1,5-Pentanediol | | — | — | — | — | — | — | 5.0 |
| Triethylene glycol-n-butyl ether | | 3.0 | 3.0 | 3.0 | 3.0 | 3.0 | 3.0 | — |
| Olfine (trade name) E1010 (*2) | | 0.2 | 0.2 | 0.2 | 0.2 | 0.2 | 0.2 | 0.2 |
| Water | | balance | balance | balance | balance | balance | balance | balance |
| Total blending amount of dyes (% by weight) | | 5.0 | 5.0 | 5.0 | 6.0 | 5.0 | 5.0 | 5.0 |

Tables 2 to 4—Legend

*1: Produced by KAO CORPORATION; numeral in the table indicates active ingredient amount.

*2: Acetylene glycol-based surfactant (ethylene oxide (10 mol) adduct of diol); manufactured by NISSHIN KAGAKU KOGYO KK.

Examples 1 to 9 and Comparative Examples 1 to 15

An ink jet printer-equipped digital multifunction machine "DCP-J525N" manufactured by BROTHER KOGYO KABUSHIKI KAISHA was used to form composite black on a photograph glossy paper sheet "BP71G" manufactured by BROTHER KOGYO KABUSHIKI KAISHA by using the water-based yellow ink, water-based magenta ink and water-based cyan ink shown in the following TABLE 5. Then, (a) optical density (OD value) evaluation, (b) fixability evaluation, and (c) overall evaluation were performed with the following method.

(a) Optical Density (OD Value) Evaluation

Composite black was formed in an environment of temperature: 25° C., relative humidity: 50%, and was stored for 24 hours in the same environment as that provided during the formation to obtain ordinary temperature-ordinary humidity environment samples. The optical density (OD value) of each of the ordinary temperature-ordinary humidity environment samples was measured by using a spectrophotometric colorimetry meter "SpectroEye" (field: 2°; reference white: Abs (absolute white); light source: $D_{50}$; density: ANSI T) manufactured by GRETAG MACBETH, and evaluations were made for the evaluation samples based on the following evaluation criterion.

[Evaluation Criterion of Optical Density (OD Value)]
AA: The OD value was not less than 1.65.
A: The OD value was not less than 1.60 and less than 1.65.
B: The OD value was not less than 1.55 and less than 1.60.
C: The OD value was less than 1.55.

(b) Fixability Evaluation

Composite black was formed in an environment of temperature: 25° C., relative humidity: 50%. After 5 seconds had elapsed since the formation of the composite black, a composite-black formation portion at which the composite black had been formed was rubbed with a cotton swab. Any presence or absence of blurring of the composite-black formation portion was visually observed, and evaluations were made for the evaluation samples based on the following evaluation criterion.

[Evaluation Criterion of Fixability]
A: Blurring of the composite-black formation portion was hardly observed.
B: Blurring of the composite-black formation portion was observed.

(c) Overall Evaluation

With respect to the water-based inks of Examples 1 to 9 and Comparative Examples 1 to 15, the overall evaluation was performed in accordance with the following evaluation criterion based on the results of (a) optical density (OD value) evaluation and (b) fixability evaluation as described above.

[Evaluation Criterion for Overall Evaluation]
G: There was no "B" and "C" evaluations in both of the results of (a) and (b).
NG: There was "B" or "C" evaluation in either one of (a) and (b).

The composition and the results of evaluation of each of the water-based yellow ink, water-based magenta ink and water-based cyan ink used in Examples 1 to 9 and Comparative Examples 1 to 15 are shown in TABLE 5 as follows.

TABLE 5

| Water-based ink; Total blending amount (% by weight) of dye; and Duty | | | | | | | | | Dye drop amount per a 25.4 mm × 25.4 mm area | | | C/ (Y + M) | Y + M + C | Evaluations | | |
|---|---|---|---|---|---|---|---|---|---|---|---|---|---|---|---|---|
| Yellow | | | Magenta | | | Cyan | | | | | | | | | | |
| | Blend. | | | Blend. | | | Blend. | | | | | | | OD value | Fixability | Overall |
| Ink | At. | Duty | Ink | At. | Duty | Ink | At. | Duty | Y | M | C | | | | | |
| EX. 1 | Y1 | 4 | 41 | M1 | 4 | 63 | C1 | 5 | 59 | 135 | 204 | 250 | 0.74 | 588 | AA | A | G |
| EX. 2 | Y2 | 4 | 41 | M2 | 4 | 63 | C2 | 5 | 59 | 135 | 204 | 250 | 0.74 | 588 | AA | A | G |
| EX. 3 | Y3 | 4 | 41 | M3 | 5 | 51 | C3 | 5 | 59 | 135 | 206 | 250 | 0.73 | 590 | AA | A | G |
| EX. 4 | Y1 | 4 | 41 | M1 | 4 | 63 | C1 | 5 | 54 | 135 | 204 | 228 | 0.68 | 567 | AA | A | G |
| EX. 5 | Y4 | 3 | 54 | M4 | 4 | 63 | C4 | 6 | 45 | 133 | 204 | 228 | 0.68 | 565 | AA | A | G |

TABLE 5-continued

| | Water-based ink; Total blending amount (% by weight) of dye; and Duty | | | | | | | | | Dye drop amount per a 25.4 mm × 25.4 mm area | | | C/(Y+M) | Y+M+C | Evaluations | | |
|---|---|---|---|---|---|---|---|---|---|---|---|---|---|---|---|---|---|
| | Yellow | | | Magenta | | | Cyan | | | | | | | | OD value | Fixa-bility | O-verall |
| | Ink | Blend. At. | Duty | Ink | Blend. At. | Duty | Ink | Blend. At. | Duty | Y | M | C | | | | | |
| EX. 6 | Y5 | 4 | 41 | M2 | 4 | 63 | C5 | 5 | 54 | 135 | 204 | 228 | 0.68 | 567 | AA | A | G |
| EX. 7 | Y1 | 4 | 41 | M1 | 4 | 63 | C1 | 5 | 53 | 135 | 204 | 224 | 0.66 | 562 | A | A | G |
| EX. 8 | Y2 | 4 | 41 | M3 | 5 | 51 | C4 | 6 | 44 | 135 | 206 | 223 | 0.66 | 564 | A | A | G |
| EX. 9 | Y6 | 4 | 41 | M5 | 4 | 63 | C7 | 5 | 53 | 135 | 204 | 224 | 0.66 | 562 | A | A | G |
| C. EX. 1 | Y1 | 4 | 41 | M1 | 4 | 63 | C1 | 5 | 50 | 135 | 204 | 212 | 0.63 | 550 | B | A | NG |
| C. EX. 2 | Y2 | 4 | 41 | M2 | 4 | 63 | C2 | 5 | 50 | 135 | 204 | 212 | 0.63 | 550 | B | A | NG |
| C. EX. 3 | Y3 | 4 | 41 | M3 | 5 | 51 | C3 | 5 | 50 | 135 | 206 | 212 | 0.62 | 552 | B | A | NG |
| C. EX. 4 | Y1 | 4 | 41 | M1 | 4 | 76 | C1 | 5 | 50 | 135 | 246 | 212 | 0.56 | 592 | B | A | NG |
| C. EX. 5 | Y4 | 3 | 54 | M4 | 4 | 76 | C4 | 6 | 41 | 133 | 246 | 208 | 0.55 | 587 | B | A | NG |
| C. EX. 6 | Y5 | 4 | 41 | M2 | 4 | 76 | C5 | 5 | 50 | 135 | 246 | 212 | 0.56 | 592 | B | A | NG |
| C. EX. 7 | Y1 | 4 | 47 | M1 | 4 | 63 | C1 | 5 | 50 | 154 | 204 | 212 | 0.59 | 569 | C | A | NG |
| C. EX. 8 | Y2 | 4 | 47 | M3 | 5 | 51 | C4 | 6 | 41 | 154 | 206 | 208 | 0.58 | 568 | C | A | NG |
| C. EX. 9 | Y6 | 4 | 47 | M5 | 4 | 63 | C7 | 5 | 50 | 154 | 204 | 212 | 0.59 | 569 | C | A | NG |
| C. EX. 10 | Y1 | 4 | 41 | M1 | 4 | 76 | C1 | 5 | 59 | 135 | 246 | 250 | 0.66 | 630 | AA | B | NG |
| C. EX. 11 | Y2 | 4 | 41 | M2 | 4 | 76 | C2 | 5 | 59 | 135 | 246 | 250 | 0.66 | 630 | AA | B | NG |
| C. EX. 12 | Y1 | 4 | 41 | M1 | 4 | 63 | C1 | 5 | 42 | 135 | 204 | 178 | 0.53 | 516 | C | A | NG |
| C. EX. 13 | Y5 | 4 | 41 | M2 | 4 | 63 | C5 | 5 | 42 | 135 | 204 | 178 | 0.53 | 516 | C | A | NG |
| C. EX. 14 | Y1 | 4 | 34 | M1 | 4 | 63 | C1 | 5 | 50 | 112 | 204 | 212 | 0.67 | 527 | B | A | NG |
| C. EX. 15 | Y6 | 4 | 34 | M5 | 4 | 63 | C7 | 5 | 50 | 112 | 204 | 212 | 0.67 | 527 | B | A | NG |

In TABLE 5, 'EX.' means 'Example', 'C.EX.' means 'Comparative Example', and 'Blend. At.' means 'Blending amount'.

As shown in TABLE 5, Examples 1 to 9 each satisfying the condition (A): $0.66 \leq C/(Y+M)$ and the condition (B): $530 \leq Y+M+C \leq 600$ had satisfactory results in the evaluations of optical density (OD value) and fixability. In Examples 1 to 6 satisfying the condition (A2): $0.68 \leq C/(Y+M)$ described above, the result in the evaluation of optical density (OD value) was particularly satisfactory.

On the other hand, in Comparative Examples 1 to 6 in each of which the condition (A) was not satisfied, namely, a condition: $0.66 > C/(Y+M)$ was present and the ratio of the cyan dye in the composite black was low, the result in the evaluation of optical density (OD value) was unsatisfactory. Further, in Comparative Examples 7 to 9 in each of which the condition: $0.66 > C/(Y+M)$ was present and the total amount of the dyes of three primal colors was smaller than that in Comparative Examples 4 to 6, the result in the evaluation of optical density (OD value) was quite unsatisfactory. Furthermore, in Comparative Examples 10 and 11 in each of which the condition (B) was not satisfied, namely, a condition: $600 < Y+M+C$ was present, the evaluation of fixability was unsatisfactory. Moreover, in each of Comparative Examples 12 and 13, in each of which the conditions (A) and (B) were not satisfied, namely, a condition: $0.66 > C/(Y+M)$ and a condition: $530 > Y+M+C$ were present, the evaluation of optical density (OD value) was quite unsatisfactory. Further, in Comparative Examples 14 and 15 in each of which the condition (B) was not satisfied, namely, a condition: $530 > Y+M+C$ was present and the total amount of the dyes of the three primary colors was small, the evaluation of optical density (OD value) was unsatisfactory.

As described above, according to the present teaching, the composite black capable of suppressing the lowering in the optical density (OD value) (capable of improving the optical density (OD value) and realizing the excellent fixability can be formed. The formation of the composite black of the present teaching is widely applicable to a variety of kinds of ink-jet recording.

What is claimed is:

1. An ink-jet recording apparatus configured to perform recording on a recording medium, the apparatus comprising:
   a water-based yellow ink which contains a yellow dye and of which hue angle ∠H° defined in a CIELAB color space on the recording medium is in a range of 80° to 100';
   a water-based magenta ink which contains a magenta dye and of which hue angle ∠H° defined in the CIELAB color space is in a range of 0° to 5° or in a range of 345° to 360°;
   a water-based cyan ink which contains a cyan dye and of which hue angle ∠H° defined in the CIELAB color space is in a range of 220° to 240°;
   an ink-jet head configured to discharge the water-based yellow ink, the water-based magenta ink and the water-based cyan ink; and
   a controller configured to control the ink-jet head so as to satisfy the following conditions (A) and (B) to thereby form a composite black on the recording medium:

$$0.66 \leq C/(Y+M) \quad \text{(A)}$$

$$530 \leq Y+M+C \leq 600, \quad \text{(B)}$$

wherein in the conditions (A) and (B):
   Y: a drop amount (ng) of the yellow dye dropped in a 25.4 mm×25.4 mm area of the recording medium;
   M: a drop amount (ng) of the magenta dye dropped in the 25.4 mm×25.4 mm area of the recording medium; and
   C: a drop amount (ng) of the cyan dye dropped in the 25.4 mm×25.4 mm area of the recording medium.

2. The ink jet recording apparatus according to claim 1, wherein the yellow dye includes a yellow dye (Y-1) and a yellow dye (Y-2), the magenta dye includes a magenta dye (M-1) and a magenta dye (M-2), and the cyan dye includes a cyan dye (C-1),
   wherein the yellow dye (Y-1) is a dye represented by the following formula (Y-1);
   the yellow dye (Y-2) is at least one dye selected from the group consisting of C. I. Direct Yellow 86, C. I. Direct Yellow 132, and C. I. Direct Yellow 142;

the magenta dye (M-1) is a dye represented by the following formula (M-1);

the magenta dye (M-2) is at least one dye selected from the group consisting of a dye represented by the following formula (M-2a), a dye represented as the following formula (M-2b) or a salt thereof, C. I. Acid Red 1, and C. I. Acid Red 254, and the cyan dye (C-1) is a dye represented by the following formula (C-1),

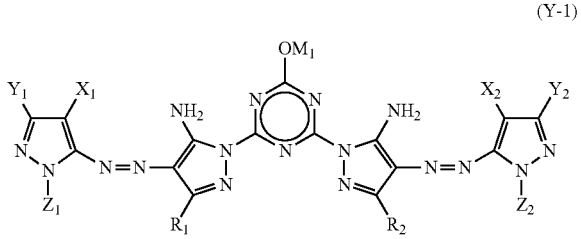
(Y-1)

in the formula (Y-1):
- $R_1$, $R_2$, $Y_1$, and $Y_2$ each represent a monovalent group, and $R_1$, $R_2$, $Y_1$, and $Y_2$ are identical to or different from one another;
- $X_1$ and $X_2$ each represent an electron attractive group, and $X_1$ and $X_2$ are identical to or different from each other;
- $Z_1$ and $Z_2$ each represent a hydrogen atom, a substituted or unsubstituted alkyl group, a substituted or unsubstituted alkenyl group, a substituted or unsubstituted alkynyl group, a substituted or unsubstituted aryl group, or a substituted or unsubstituted heterocyclic group, and $Z_1$ and $Z_2$ are identical to or different from one another;
- $M_1$ represents a hydrogen atom, alkali metal atom, $NH_4$, or $NR_4$, wherein R represents an alkyl group or an aryl group,

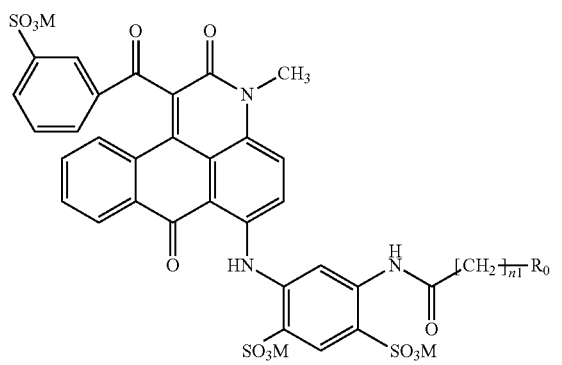
(M-1)

in the formula (M-1):
- m is 1 or 2;
- three Ms each represent sodium or $NH_4$, and the three Ms are identical to or different from one another; and
- $R_0$ represents a monoalkylamino group having 1 to 8 carbon atoms, substituted with a carboxyl group,

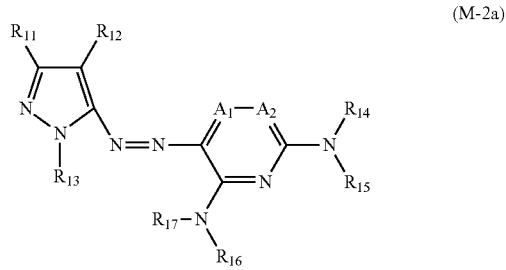
(M-2a)

in the formula (M-2a):
- $R_{11}$ represents a hydrogen atom, a substituted or unsubstituted alkyl group, or a substituted or unsubstituted aryl group;
- $R_{12}$ represents a hydrogen atom, a halogen atom, or a cyano group;
- $R_{13}$ represents a hydrogen atom, a substituted or unsubstituted alkyl group, a substituted or unsubstituted aryl group, or a substituted or unsubstituted heterocyclic group;
- $R_{14}$, $R_{15}$, $R_{16}$, and $R_{17}$ each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, and $R_{14}$, $R_{15}$, $R_{16}$, and $R_{17}$ are identical to or different from one another, not both of $R_{14}$ and $R_{15}$ are hydrogen atoms, and not both of $R_{16}$ and $R_{17}$ are hydrogen atoms; and
- $A_1$ and $A_2$ are both substituted or unsubstituted carbon atoms, or one of $A_1$ and $A_2$ is a substituted or unsubstituted carbon atom and the other is a nitrogen atom,

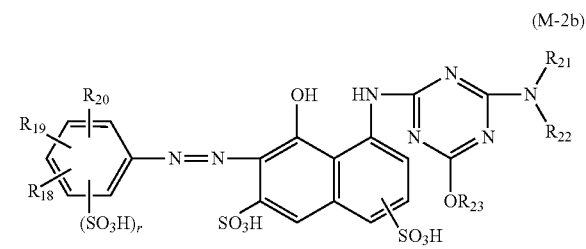
(M-2b)

in the formula (M-2b):
- r is 0, 1, or 2;
- $R_{18}$, $R_{19}$, and $R_{20}$ each represent a substituted or unsubstituted alkyl group, a substituted or unsubstituted alkoxy group, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonic acid ester group, a substituted or unsubstituted alkylsulfonyl group, a substituted or unsubstituted arylsulfonyl group, a carboxyl group, or a carboxylic acid ester group, and $R_{18}$, $R_{19}$, and $R_{20}$ are identical to or different from one another; and
- $R_{21}$, $R_{22}$, and $R_{23}$ each represent a hydrogen atom, a substituted or unsubstituted alkyl group, a substituted or unsubstituted alkenyl group, a substituted or unsubstituted aryl group, a substituted or unsubstituted alicyclic group, or a substituted or unsubstituted heterocyclic group, and $R_{21}$, $R_{22}$, and $R_{23}$ are identical to or different from one another,

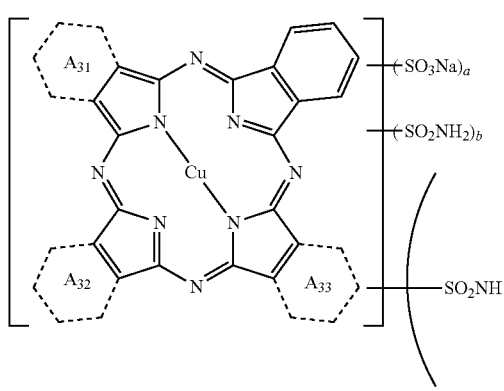 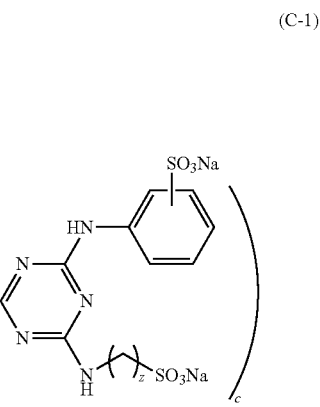

(C-1)

in the formula (C-1):
each of rings $A_{31}$, $A_{32}$, and $A_{33}$ is a benzene ring, a 2,3-pyridine ring, or a 3,2-pyridine ring;
at least one of the rings $A_{31}$, $A_{32}$, and $A_{33}$ represents a 2,3-pyridine ring or a 3,2-pyridine ring; and
the rings $A_{31}$, $A_{32}$, and $A_{33}$ are identical to or different from one another;
a satisfies $0 \leq a \leq 4$;
b satisfies $0 \leq b \leq 4$;
c satisfies $0 \leq c \leq 4$;
a, b, and c satisfy $0 \leq a+b+c \leq 4$;
z is an integer satisfying $1 \leq z \leq 3$; and
$R_{30}$ represents a straight chain alkylene group having 1 to 6 carbon atoms.

3. The ink jetrecording apparatus according to claim 1, wherein the controller is configured to control the ink-jet head so as to satisfy the following condition (A2) to thereby form the composite black:

$$0.68 \leq C/(Y+M), \quad (A2)$$

wherein in the condition (A2):
Y: drop amount (ng) of the yellow dye dropped in a 25.4 mm×25.4 mm area of the recording medium;
M: drop amount (ng) of the magenta dye dropped in the 25.4 mm×25.4 mm area of the recording medium; and
C: drop amount (ng) of the cyan dye dropped in the 25.4 mm×25.4 mm area of the recording medium.

4. The ink jetrecording apparatus according to claim 1, wherein a blending amount of the yellow dye contained in the water-based yellow ink is in a range of 2% by weight to 6% by weight;
a blending amount of the magenta dye contained in the water-based magenta ink is in a range of 2% by weight to 6% by weight; and
a blending amount of the cyan dye contained in the water-based cyan ink is in a range of 2% by weight to 7% by weight.

5. The ink jetrecording apparatus according to claim 1, wherein a blending amount of the yellow dye in the water-based yellow ink, a blending amount of the magenta dye in the water-based magenta ink and a blending amount of the cyan dye in the water-based cyan ink satisfy the following formula:

$$y \leq m \leq c,$$

wherein in the formula,
y represents the blending amount of the yellow dye in the water-based yellow ink,
m represents the blending amount of the magenta dye in the water-based magenta ink, and
c represents the blending amount of the cyan dye in the water-based cyan ink.

6. The ink jetrecording apparatus according to claim 1, wherein the recording medium is a glossy paper sheet.

7. The ink jetrecording apparatus according to claim 6, wherein the glossy paper sheet is a glossy paper sheet having a silica layer which includes silica particles having voids therebetween or silica particles having voids in the interior thereof.

8. The ink jetrecording apparatus according to claim 1, wherein the controller is configured to control the ink-jet head so as to discharge the water-based yellow ink, the water-based cyan ink and the water-based magenta ink in this order to thereby form the composite black on the recording medium.

9. The ink jetrecording apparatus according to claim 1, wherein the ink-jet recording apparatus has a plurality of printing mode including a glossy paper sheet printing mode using a glossy paper sheet and a plain paper sheet printing mode using a plain paper sheet, and
in a case that the glossy paper sheet printing mode is selected among the plurality of printing modes, the controller is configured to control the ink-jet head so as to satisfy the conditions (A) and (B) to thereby form a composite black on the recording medium.

10. An ink-jet recording method for performing recording on a recording medium, the method comprising
discharging, onto the recording medium, a water-based yellow ink, a water-based magenta ink and a water-based cyan ink so as to satisfy the following conditions (A) and (B) to thereby form a composite black on the recording medium:

$$0.66 \leq C/(Y+M) \quad (A)$$

$$530 \leq Y+M+C \leq 600, \quad (B)$$

wherein in the conditions (A) and (B):
Y: a drop amount (ng) of the yellow dye dropped in a 25.4 mm×25.4 mm area of the recording medium;
M: a drop amount (ng) of the magenta dye dropped in the 25.4 mm×25.4 mm area of the recording medium; and
C: a drop amount (ng) of the cyan dye dropped in the 25.4 mm×25.4 mm area of the recording medium,
the water-based yellow ink contains a yellow dye and has hue angle $\angle H°$ defined in a CIELAB color space on the recording medium in a range of 80° to 100°,
the water-based magenta ink contains a magenta dye and has hue angle $\angle H°$ defined in the CIELAB color space in a range of 0° to 5° or in a range of 345° to 360°, and the water-based cyan ink contains a cyan dye and has hue angle ∠H° defined in the CIELAB color space in a range of 220° to 240°.

11. The ink jetrecording method according to claim 10, wherein the yellow dye includes a yellow dye (Y-1) and a yellow dye (Y-2), the magenta dye includes a magenta dye (M-1) and a magenta dye (M-2), and the cyan dye includes a cyan dye (C-1);
wherein the yellow dye (Y-1) is a dye represented by the following formula (Y-1);
the yellow dye (Y-2) is at least one dye selected from the group consisting of C. I. Direct Yellow 86, C. I. Direct Yellow 132, and C. I. Direct Yellow 142;
the magenta dye (M-1) is a dye represented by the following formula (M-1);
the magenta dye (M-2) is at least one dye selected from the group consisting of a dye represented by the following formula (M-2a), a dye represented as the following formula (M-2b) or a salt thereof, C. I. Acid Red 1, and C. I. Acid Red 254; and
the cyan dye (C-1) is a dye represented by the following formula (C-1),

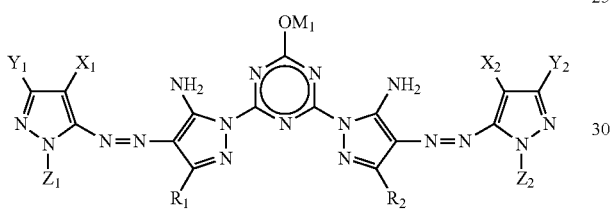
(Y-1)

in the formula (Y-1):
$R_1, R_2, Y_1$, and $Y_2$ each represent a monovalent group, and $R_1, R_2, Y_1$, and $Y_2$ are identical to or different from one another;
$X_1$ and $X_2$ each represent an electron attractive group, and $X_1$ and $X_2$ are identical to or different from each other;
$Z_1$ and $Z_2$ each represent a hydrogen atom, a substituted or unsubstituted alkyl group, a substituted or unsubstituted alkenyl group, a substituted or unsubstituted alkynyl group, a substituted or unsubstituted aryl group, or a substituted or unsubstituted heterocyclic group, and $Z_1$ and $Z_2$ are identical to or different from each other;
$M_1$ represents a hydrogen atom, alkali metal atom, $NH_4$, or $NR_4$, wherein R represents an alkyl group or an aryl group,

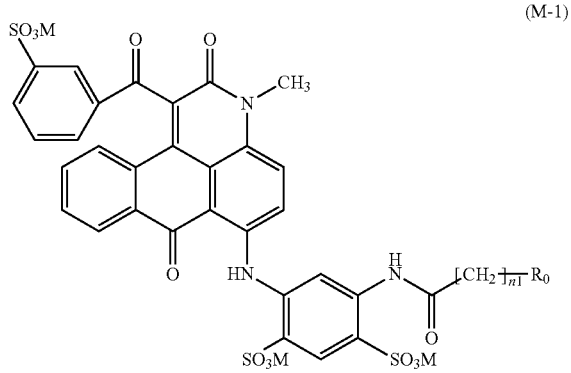
(M-1)

in the formula (M-1):
$n_1$ is 1 or 2;
three Ms each represent sodium or $NH_4$, and the three Ms are identical to or different from one another; and
$R_0$ represents a monoalkylamino group having 1 to 8 carbon atoms, substituted with a carboxyl group,

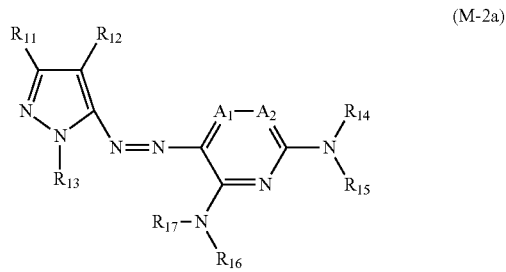
(M-2a)

in the formula (M-2a):
$R_{11}$ represents a hydrogen atom, a substituted or unsubstituted alkyl group, or a substituted or unsubstituted aryl group;
$R_{12}$ represents a hydrogen atom, a halogen atom, or a cyano group;
$R_{13}$ represents a hydrogen atom, a substituted or unsubstituted alkyl group, a substituted or unsubstituted aryl group, or a substituted or unsubstituted heterocyclic group;
$R_{14}$, $R_{15}$, $R_{16}$, and $R_{17}$ each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, $R_{14}$, $R_{15}$, $R_{16}$, and $R_{17}$ are identical to or different from one another, not both of $R_{14}$ and $R_{15}$ are hydrogen atoms, and not both of $R_{16}$ and $R_{17}$ are hydrogen atoms; and
$A_1$ and $A_2$ are both substituted or unsubstituted carbon atoms, or one of $A_1$ and $A_2$ is a substituted or unsubstituted carbon atom and the other is a nitrogen atom,

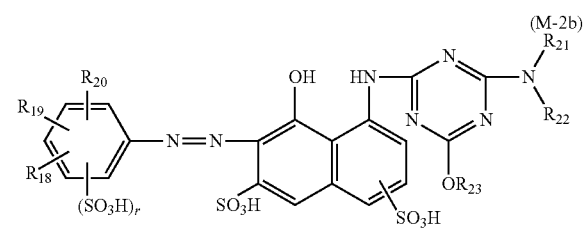
(M-2b)

in the formula (M-2b):
r is 0, 1, or 2;
$R_{18}$, $R_{19}$, and $R_{20}$ each represent a substituted or unsubstituted alkyl group, a substituted or unsubstituted alkoxy group, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonic acid ester group, a substituted or unsubstituted alkylsulfonyl group, a substituted or unsubstituted arylsulfonyl group, a carboxyl group, or a carboxylic acid ester group, and $R_{18}$, $R_{19}$, and $R_{20}$ are identical to or different from one another; and
$R_{21}$, $R_{22}$, and $R_{23}$ each represent a hydrogen atom, a substituted or unsubstituted alkyl group, a substituted or unsubstituted alkenyl group, a substituted or unsubstituted aryl group, a substituted or unsubstituted alicyclic group, or a substituted or unsubstituted heterocyclic group, and $R_{21}$, $R_{22}$, and $R_{23}$ are identical to or different from one another,

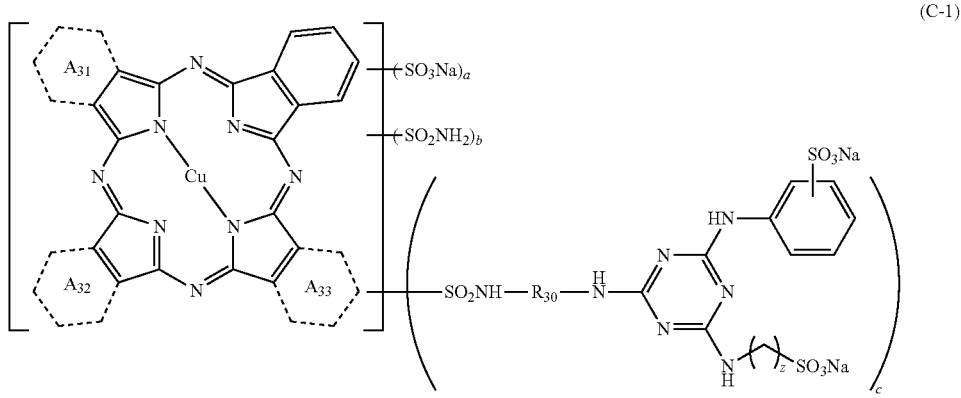

(C-1)

in the formula (C-1):
each of rings $A_{31}$, $A_{32}$, and $A_{33}$ is a benzene ring, a 2,3-pyridine ring, or a 3,2-pyridine ring;
at least one of the rings $A_{31}$, $A_{32}$, and $A_{33}$ represents a 2,3-pyridine ring or a 3,2-pyridine ring; and
the rings $A_{31}$, $A_{32}$, and $A_{33}$ are identical to or different from one another;
a satisfies $0 \leq a \leq 4$;
b satisfies $0 \leq b \leq 4$;
c satisfies $0 \leq c \leq 4$;
a, b, and c satisfy $0 \leq a+b+c \leq 4$;
z is an integer satisfying $1 \leq z \leq 3$; and
$R_{30}$ represents a straight chain alkylene group having 1 to 6 carbon atoms.

12. The ink jetrecording method according to claim 10, wherein the water-based yellow ink, the water-based magenta ink and the water-based cyan ink are discharged, onto the recording medium, so as to satisfy the following condition (A2) to thereby form a composite black on the recording medium:

$$0.68 \leq C/(Y+M), \quad (A2)$$

wherein in the condition (A2):
Y: drop amount (ng) of the yellow dye dropped in a 25.4 mm×25.4 mm area of the recording medium;
M: drop amount (ng) of the magenta dye dropped in the 25.4 mm×25.4 mm area of the recording medium; and
C: drop amount (ng) of the cyan dye dropped in the 25.4 mm×25.4 mm area of the recording medium.

13. The ink jetrecording method according to claim 10, wherein a blending amount of the yellow dye contained in the water-based yellow ink is in a range of 2% by weight to 6% by weight;
a blending amount of the magenta dye contained in the water-based magenta ink is in a range of 2% by weight to 6% by weight; and
a blending amount of the cyan dye contained in the water-based cyan ink is in a range of 2% by weight to 7% by weight.

14. The ink jetrecording method according to claim 10, wherein a blending amount of the yellow dye in the water-based yellow ink, a blending amount of the magenta dye in the water-based magenta ink and a blending amount of the cyan dye in the water-based cyan ink satisfy the following formula:

$$y \leq m \leq c,$$

wherein in the formula,
y represents the blending amount of the yellow dye in the water-based yellow ink,
m represents the blending amount of the magenta dye in the water-based magenta ink, and
c represents the blending amount of the cyan dye in the water-based cyan ink.

15. The ink jetrecording method according to claim 10, wherein the recording medium is a glossy paper sheet.

16. The ink jetrecording method according to claim 15, wherein the glossy paper sheet is a glossy paper sheet having a silica layer which includes silica particles having voids therebetween or silica particles having voids in the interior thereof.

17. The ink jetrecording method according to claim 10, wherein the water-based yellow ink, the water-based cyan ink and the water-based magenta ink are discharged in this order to thereby form the composite black on the recording medium.

18. The ink jetrecording method according to claim 10, further comprising selecting, among a plurality of printing mode including a glossy paper sheet printing mode using a glossy paper sheet and a plain paper sheet printing mode using a plain paper sheet, the glossy paper sheet printing mode; and
in a case that the glossy paper sheet printing mode is selected, the water-based yellow ink, the water-based magenta ink and the water-based cyan ink are discharged so as to satisfy the conditions (A) and (B) to thereby form a composite black on the recording medium.

19. A recorded matter recorded by the ink jetrecording method as defined in claim 10.

20. A composite black formed on a recording medium with an ink-jet recording method by using a water-based yellow ink which contains a yellow dye and of which hue angle $\angle H°$ defined in a CIELAB color space on the recording medium is in a range of 80° to 100°, a water-based magenta ink which contains a magenta dye and of which hue angle $\angle H°$ defined in the CIELAB color space is in a range of 0° to 5° or in a range of 345° to 360°, and a water-based cyan ink which contains a cyan dye and of which hue angle $\angle H°$ defined in the CIELAB color space is in a range of 220° to 240° so as to satisfy the following conditions (A) and (B):

$$0.66 \leq C/(Y+M) \quad (A)$$

$$530 \leq Y+M+C \leq 600, \quad (B)$$

wherein in the conditions (A) and (B):
Y: a drop amount (ng) of the yellow dye dropped in a 25.4 mm×25.4 mm area of the recording medium;

M: a drop amount (ng) of the magenta dye dropped in the 25.4 mm×25.4 mm area of the recording medium; and C: a drop amount (ng) of the cyan dye dropped in the 25.4 mm×25.4 mm area of the recording medium.

* * * * *